(12) United States Patent
Modak et al.

(10) Patent No.: US 10,945,374 B2
(45) Date of Patent: Mar. 16, 2021

(54) COMBINE HEAD SKID PLATE WITH OPTIMIZED SHAPE

(71) Applicant: Deere & Company, Moline, IL (US)

(72) Inventors: Shreyas Modak, Thane (IN); Mark Schuler, Geneseo, IL (US); Adam L. Heeren, Taylor Ridge, IL (US); Sai K. Nandigam, Davenport, IA (US)

(73) Assignee: DEERE & COMPANY, Moline, IL (US)

( * ) Notice: Subject to any disclaimer, the term of this patent is extended or adjusted under 35 U.S.C. 154(b) by 211 days.

(21) Appl. No.: 16/160,982

(22) Filed: Oct. 15, 2018

(65) Prior Publication Data

US 2020/0113135 A1    Apr. 16, 2020

(51) Int. Cl.
*A01D 67/00* (2006.01)
*A01D 41/14* (2006.01)

(52) U.S. Cl.
CPC .............. *A01D 67/00* (2013.01); *A01D 41/14* (2013.01)

(58) Field of Classification Search
CPC ........ A01D 43/10; A01D 67/00; A01D 41/14; A01D 41/141
USPC .............................................. D15/28; 56/303
See application file for complete search history.

(56) References Cited

U.S. PATENT DOCUMENTS

| | | | |
|---|---|---|---|
| 4,011,709 A | 3/1977 | Mott et al. | |
| 4,729,212 A | 3/1988 | Rabitsch | |
| 4,835,954 A | 6/1989 | Enzmann | |
| 5,174,101 A | 12/1992 | Rabitsch | |
| D382,570 S * | 8/1997 | Bruns | D15/28 |
| D391,582 S * | 3/1998 | Bruns | D15/28 |
| 5,784,866 A | 7/1998 | Campbell et al. | |
| 5,924,270 A * | 7/1999 | Bruns | A01D 75/20 56/119 |
| D423,522 S | 4/2000 | Huntimer | |
| D454,576 S | 3/2002 | Huntimer | |
| 7,373,769 B2 * | 5/2008 | Talbot | A01D 34/14 56/296 |
| D752,656 S * | 3/2016 | Meyer | D15/28 |
| 9,743,587 B2 | 8/2017 | Lohrentz et al. | |
| 2009/0158699 A1 | 6/2009 | Pruitt et al. | |
| 2009/0266044 A1 * | 10/2009 | Coers | A01D 41/14 56/208 |

(Continued)

FOREIGN PATENT DOCUMENTS

DE    4140092 A1    6/1993
EP    2111741 A1    10/2009

OTHER PUBLICATIONS

Image of John Deere Hydraflex Draper, publicly available at least as early as Oct. 14, 2018 (1 page).

(Continued)

*Primary Examiner* — Arpad Fabian-Kovacs
(74) *Attorney, Agent, or Firm* — Michael Best & Friedrich LLP

(57) ABSTRACT

A skid plate for use with a combine harvester head unit moving in a direction of travel. The skid plate includes a body, and a contact surface at least partially defined by the body, the contact surface including a leading edge facing the direction of travel and a trailing edge opposite the leading edge, where the contact surface at least partially defines a groove, where the groove defines a groove width, and where the groove width varies as the groove extends away from the leading edge.

20 Claims, 42 Drawing Sheets

(56) References Cited

U.S. PATENT DOCUMENTS

2016/0014963 A1* 1/2016 Totten ................. A01D 41/141
  56/208
2019/0029176 A1* 1/2019 Yanke .................... A01D 41/14

OTHER PUBLICATIONS

Images of MacDon Draper, publicly available at least as early as Oct. 14, 2018 (1 page).
European Search Report issued in counterpart European Patent Application No. 19202793.6 dated Mar. 27, 2020 (7 pages).

* cited by examiner

US 10,945,374 B2

COMBINE HEAD SKID PLATE WITH OPTIMIZED SHAPE

FIELD OF THE INVENTION

The present disclosure relates to a combine head skid plate, and more specifically a combine head skid plate having a contact surface configured to reduce drag forces.

BACKGROUND

Combine harvesters are equipped with removable head units that, in turn, are configured to harvest a particular crop. To do so, the combine harvester directs the head unit across the surface of the field to interact with the crop material positioned thereon. In most instances, the head unit is supported upon and moves across the field in a direction of travel using a plurality of skid plates which directly engage and slide across the surface of the field.

SUMMARY

In one implementation, a skid plate for use with a combine harvester head unit moving in a direction of travel, the skid plate including a body, and a contact surface at least partially defined by the body, the contact surface including a leading edge facing the direction of travel and a trailing edge opposite the leading edge, where the contact surface at least partially defines a groove, where the groove defines a groove width, and where the groove width varies as the groove extends away from the leading edge.

In another implementation, a skid plate for use with a combine harvester head unit, the skid plate including a body, and a contact surface at least partially defined by the body. Where the contact surface at least partially defines a groove, where the groove includes a first sidewall and a second sidewall, and where the first sidewall is not parallel to the second sidewall over the entire length of the first sidewall.

In another implementation, a skid plate for use with a combine harvester head unit, the skid plate including a body, a contact surface including a leading edge and a trailing edge opposite the leading edge. The contact surface includes a first groove having a first end open to the leading edge and a second end opposite the first end, a second groove having a first end open to the leading edge and a second end opposite the first end, and a collection portion having a first end open to the second end of the first groove and the second end of the second groove.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of the formation and arrangement of components set forth in the following description or illustrated in the accompanying drawings. The disclosure is capable of supporting other implementations and of being practiced or of being carried out in various ways.

Figure 1:
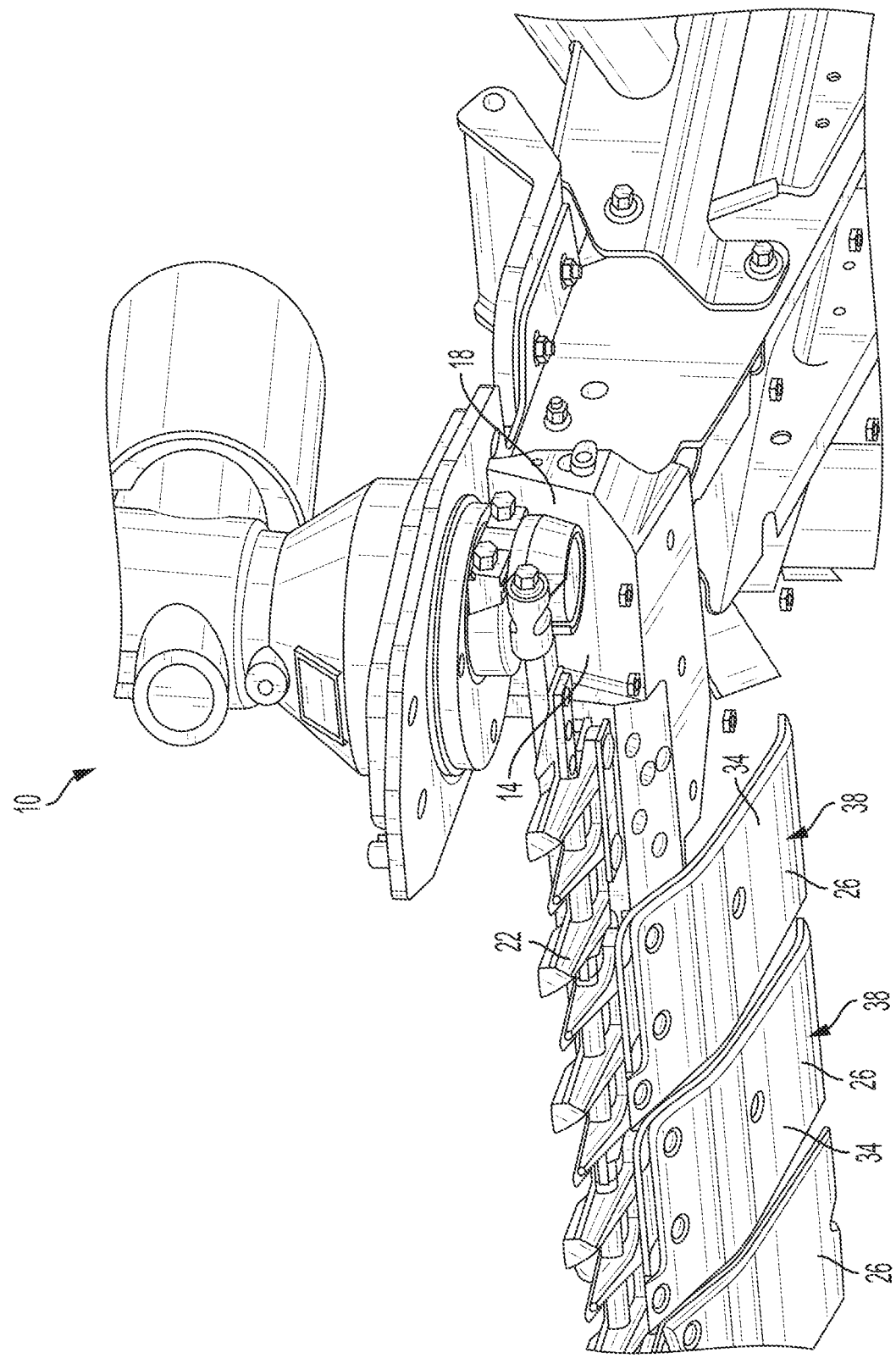
FIG. 1 is a perspective view of a head unit of a combine harvester with an improved skid plate mounted thereon.
Figure 2:
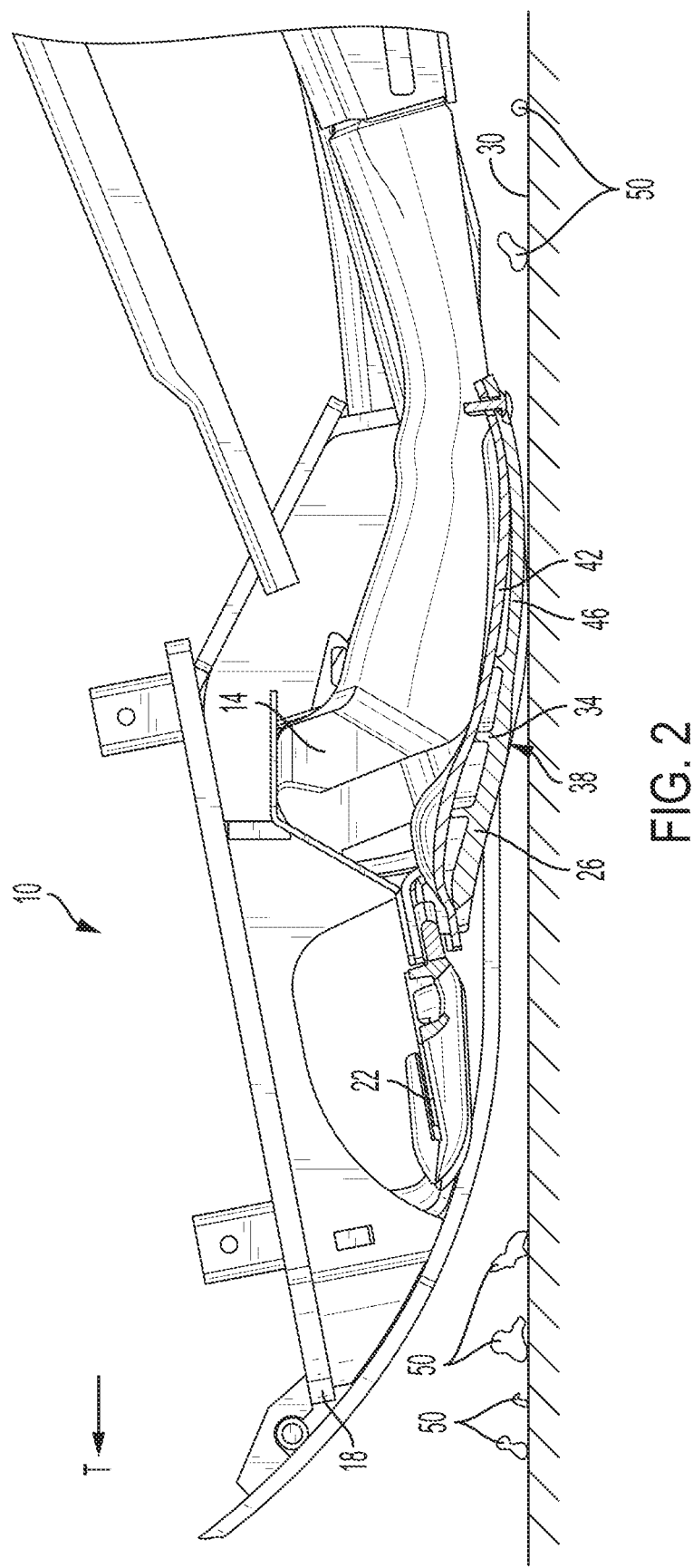
FIG. 2 is a side view of the head unit of FIG. 1.

This disclosure generally relates to a skid plate for use with a combine harvester head unit. More specifically, the skid plate forms a contact surface shaped to minimize drag forces as the skid plate travels over a support surface (e.g., the ground) while supporting the head unit thereon. In the illustrated implementation, the contact surface of the skid plates include a groove that increases in width as it extends opposite the direction of travel, FIGS. 1 and 2 illustrate a head unit 10 for use with a combine harvester (not shown). The head unit 10, in turn, includes a frame 14 having a forward or leading edge 18 facing a direction of travel T, a cutter bar assembly 22 coupled to the frame 14 proximate the leading edge 18, and one or more skid plates or skid shoes 26 coupled to the frame 14 (see FIG. 2). During harvesting operations, the head unit 10 is configured to engage and harvest crop material (not shown) positioned on a support surface 30 (e.g., the ground of the field) as is well known in the art. More specifically, the head unit 10 is directed along the top of the support surface 30 while resting on and being supported by the one or more skid shoes 26.

Each skid plate 26, of the head unit 10 includes a body 34 that at least partially forms a contact surface 38. More specifically, the body 34 of the illustrated skid plates 26, include a two-piece design having a first portion or backing plate 42 formed from a more rigid material (e.g., steel), and a second portion or contact plate 46 coupled to the first portion 42 and formed from a more wear resistant material (e.g., UHMW plastics and the like). When assembled, the first portion 42 of the body 34 provides rigidity and support for the skid plate 26 while the second portion 46 at least partially forms the contact surface 38. While the illustrated skid plate 26 includes a body 34 having a two-piece design, it is to be understood that in alternative implementations, a single piece or different multi-piece designs may be used.

As shown in FIGS. 1-3E, the contact surface 38 of the skid plate 26 is configured to engage and slide across the support surface 30 in the direction of travel T. The contour of the contact surface 38 is configured to provide sufficient support for the weight of the head unit 10 while also minimizing any drag forces produced from the motion of the skid plate 26 traveling along the support surface 30. More specifically, the contact surface 38 is shaped to engage and re-direct any debris 50 resting on top of the support surface 30 under and past the skid plate 26 to avoid the buildup of debris 50 ahead of the head unit 10 and minimize the amount of force required to advance the head unit 10 in the direction of travel T (see FIG. 2).

Figure 3A:
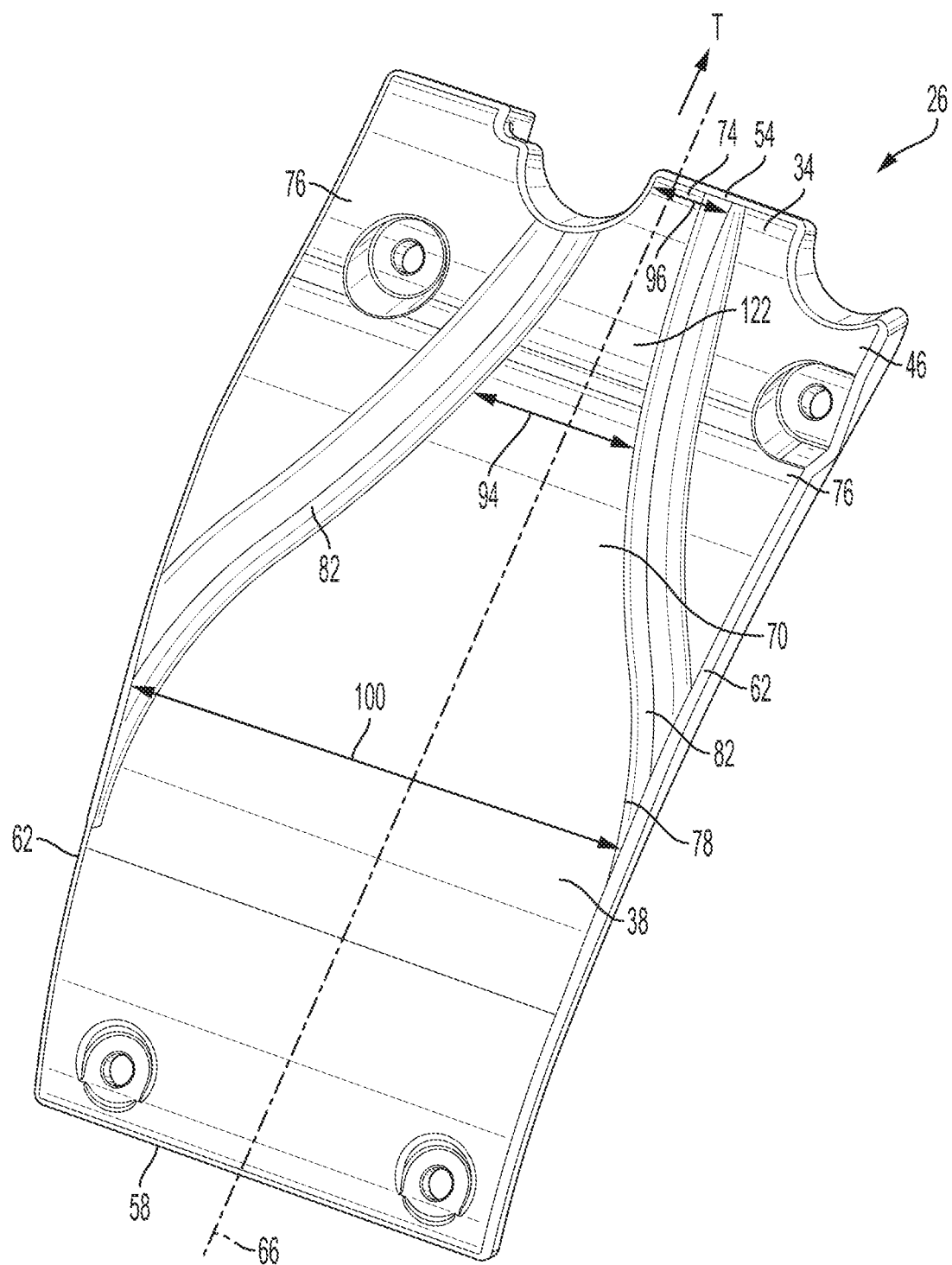
FIGS. 3A-3E illustrate a first implementation of a skid plate.
Figure 3B:
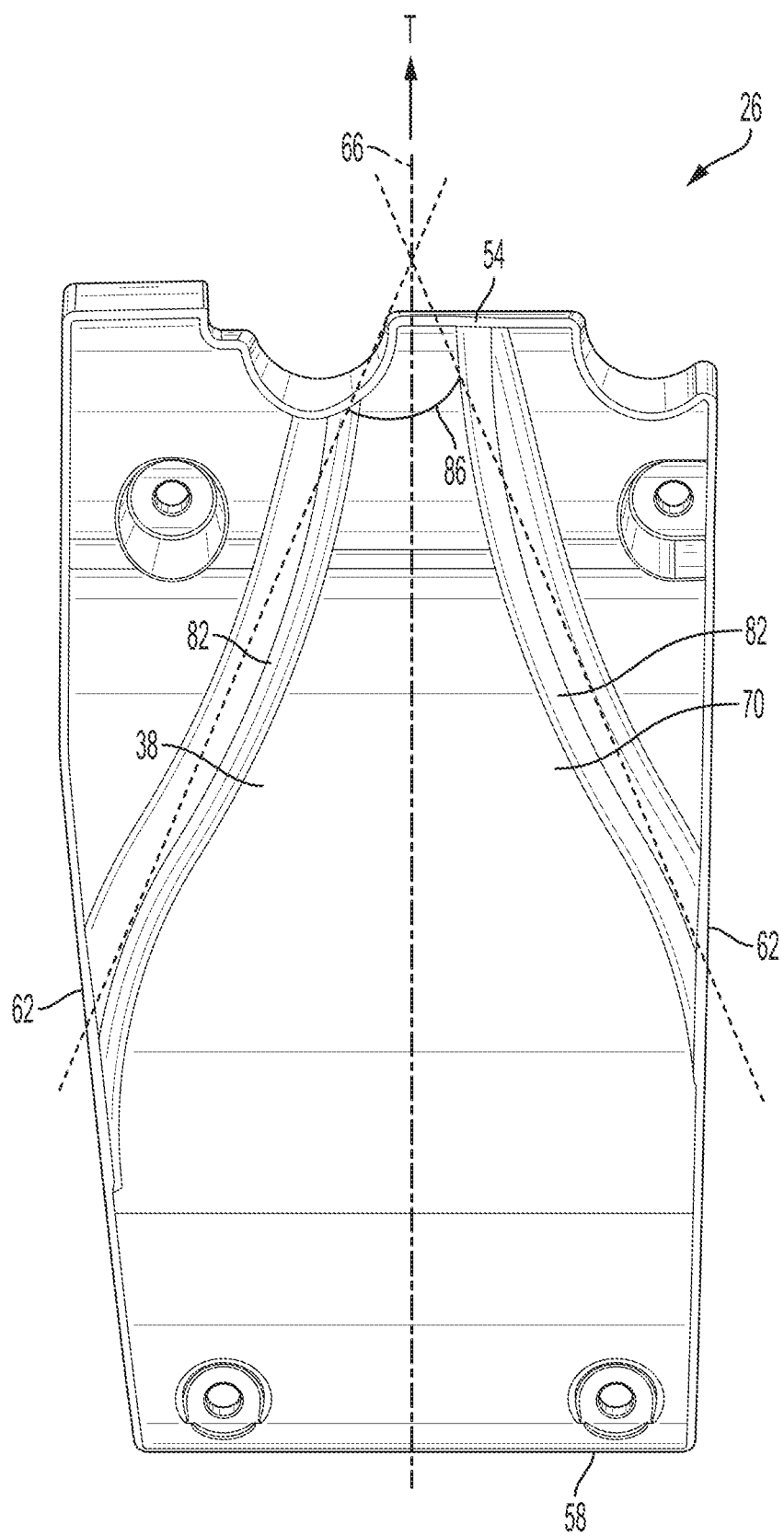
Figure 3C:
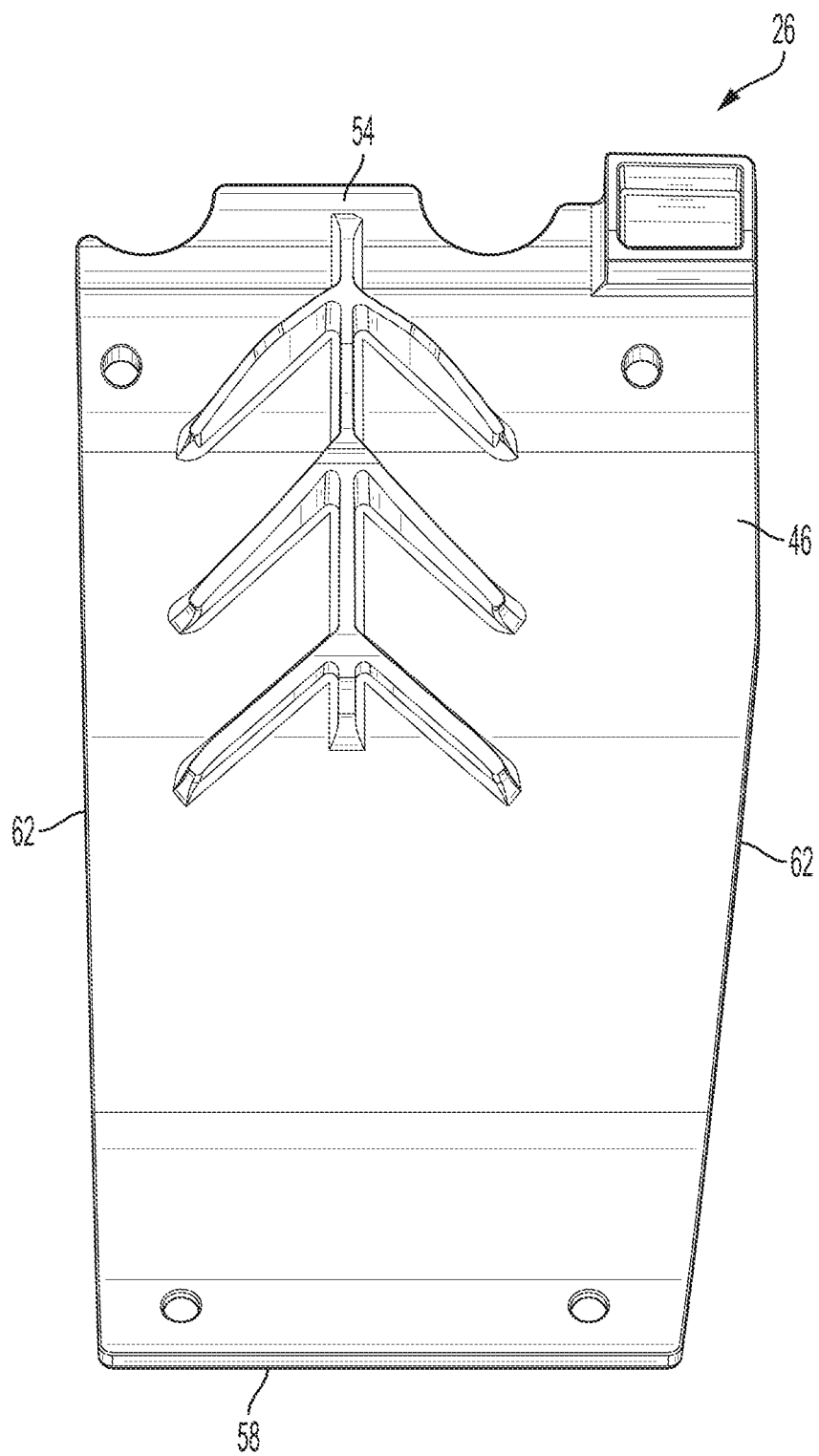

As shown in FIGS. 3A-3E, the contact surface 38 includes a leading edge 54 facing the direction of travel T, a trailing edge 58 opposite the leading edge 54 and opposite the direction of travel T, and a pair of side edges 62 each extending between the leading edge 54 and the trailing edge 58. As shown in FIG. 3B, the edges 54, 58, 62, of each skid plate 26 may be either linear or curvilinear as needed to accommodate the specific mounting conditions with the frame 14 of the head unit 10. The contact surface 38 also defines an axis 66 extending along the length thereof (e.g., between the leading edge 54 and the trailing edge 58) and oriented substantially parallel to the direction of travel T. The axis 66 is also positioned proximate the geometric center of the contact surface 38 (e.g., equally spaced between the two side edges 62; see FIG. 3B).

The contact surface 38 presents a top surface 76. The contact surface 38 further includes a groove, channel, or depression 70 formed into the top surface 76. The groove 70 generally extends along the length of the contact surface 38 (e.g., parallel to the axis 66) and includes a first end 74 proximate the leading edge 54, and a second end 78 spaced a distance from the first end 74 opposite the direction of travel T (e.g., further away from the leading edge 54). In the illustrated implementation, the second end 78 of the groove 70 is positioned between the leading edge 54 and a contact zone 98 (described below) of the contact surface 38; however in alternative implementations, the second end 78 may be positioned anywhere along the length of the contact surface 38 as desired (e.g., between the leading edge 54 and the trailing edge 58).

As shown in FIG. 3B, the sidewalls 82 of the groove 70 are not parallel to one another over at least a portion of the axial length forming an average sidewall angle 86 of less than or equal to approximately 45 degrees. In the illustrated implementation, the sidewalls 82 are not parallel to one another over their entire axial length. The sidewalls 82 are also curvilinear in shape such that the angle between the sidewalls 82 and the axis 66 vary as the sidewalls 86 extend away from the leading edge 54 (e.g., along the length of the axis 66). As shown in FIG. 3A, the vertical contour of the sidewalls 82 are also curvilinear such that they smoothly transition between the floor 90 of the groove 70 and the top surface 76.

The groove 70 also defines a groove width 94 generally defined as the width of the groove 70 taken perpendicular to the axis 66 (e.g., the direction of travel T; see FIG. 3A). In the illustrated implementation, the groove width 94 varies as the groove 70 extends away from the leading edge 54 (e.g., opposite the direction of travel T). More specifically, the groove width 94 increases as the groove 70 extends away from the leading edge 54. In the illustrated implementation, the groove 70 defines a first width 96 proximate the first end 74, and a second width 100 proximate the second end 78 that is larger than the first width 96.

Figure 3D:
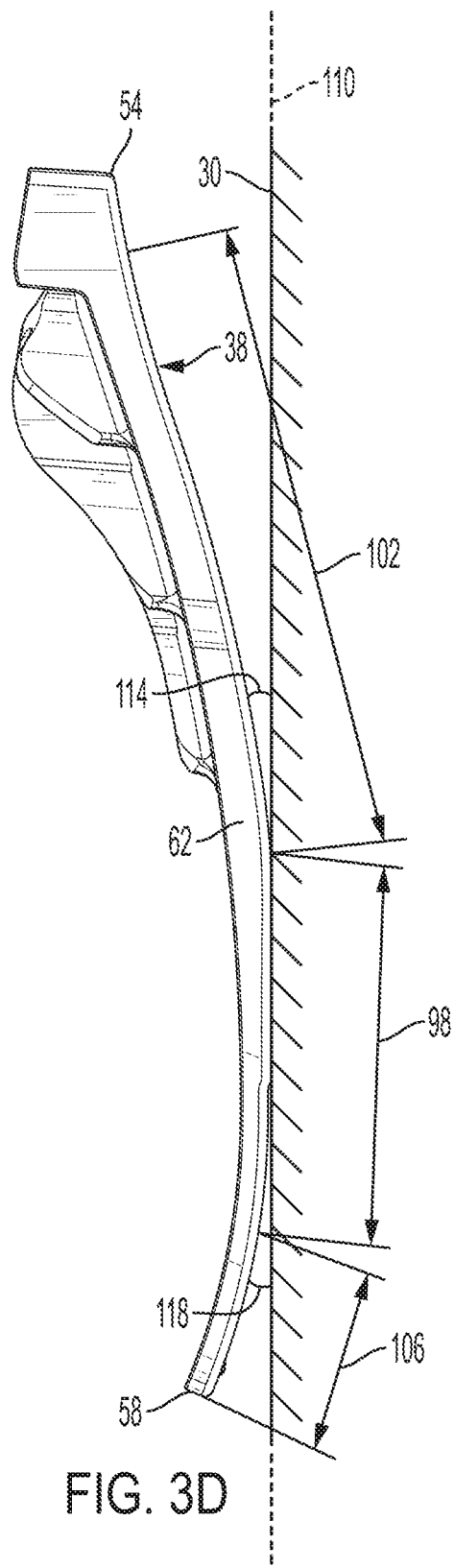
Figure 3E:
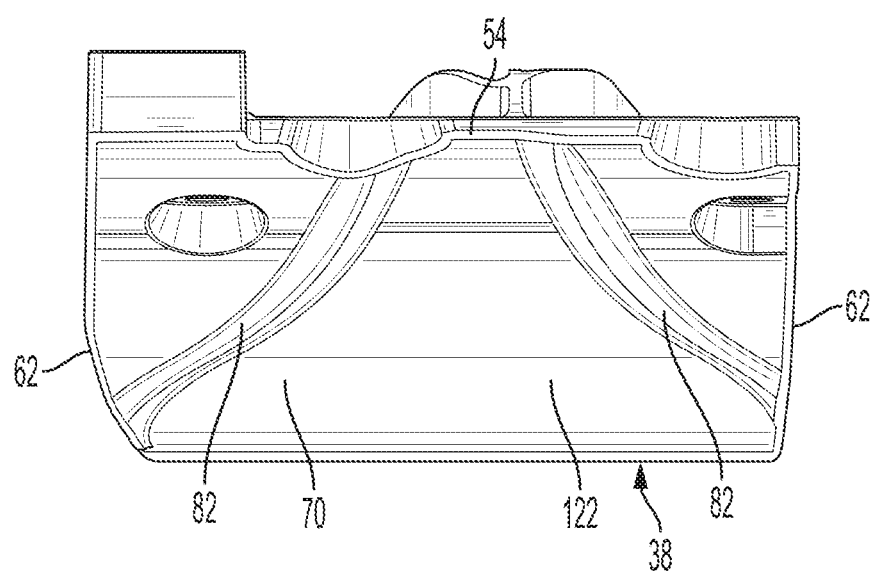

As shown in FIG. 3D, in addition to defining the groove 70 the contact surface 38 also defines an overall surface contour. More specifically, the contact surface 38 includes a convex contour that extends lengthwise from the leading edge 54 to the trailing edge 58. In the illustrated implementation, the contact surface 38 includes first portion or contact zone 98 configured to be in direct engagement with the support surface 30 during use (see FIG. 3D), a second portion or tip 102 extending between the contact zone 98 and the leading edge 54, and a third portion or tail 106 extending between the contact zone 98 and the trailing edge 58. The contact surface 38 also defines a contact plane 110 coincident with the contact zone 98. During use, the contact zone 98 is configured remain in direct contact with the support surface 30 while both the second portion 102 and the third portion 106 extend vertically upwardly from the contact zone 98 and out of engagement with the contact surface 30. As such, both the second portion 102 and the third portion 106 are non-planar with the contact plane 110.

Still further, the second portion 102 forms a non-zero entry angle 114 with respect to the support plane 110 and the third portion 106 defines a non-zero exit angle 118 with respect to the support plane 110 (see FIG. 3D). In other implementations, at least one of the entry angle 114 and the exit angle 118 may be at least 5 degrees. In still other implementations, at least one of the entry angle and the exit angle may be at least 10 degrees. Stated differently, both the leading edge 54 and the trailing edge 58 of the contact surface 38 are positioned vertically above the contact plane 110 and are not in direct contact with the support surface 30 during use.

While the illustrated skid plate 26 has a set width and substantially rectangular overall shape, it is to be understood that the width and shape, among other features, may be adjusted to accommodate different head unit types. For example, the illustrated skid plate 26 is configured for use with a flexible-style head unit 10 (e.g., generally dictating a narrower overall width) the skid plate 26 may be used with a rigid-style head unit (not shown) as well. Still further, the overall shape of the skid plate 26 may be changed as necessary depending on the specific mounting location on the head unit 10 and the type of head unit being used.

FIGS. 4A-4E illustrate another implementation of the contact surface 38b. The contact surface 38b is substantially similar to the contact surface 38 shown in FIGS. 3A-3E, as such, only the differences will be described herein with similar elements having a "b" suffix. The contact surface 38b presents a top surface that includes a groove, channel, or depression 70b formed therein. The groove 70b generally extends along the length of the contact surface 38b (e.g., parallel to the axis 66b) and includes a first end 74b proximate the leading edge 54b, and a second end 78b spaced a distance from the first end 74b opposite the direction of travel T (e.g., further away from the leading edge 54b) and between the leading edge 54b and the trailing edge 58b. In the illustrated implementation, the second end 78b of the groove 70b is positioned within the contact zone 98b.

Figure 4A:
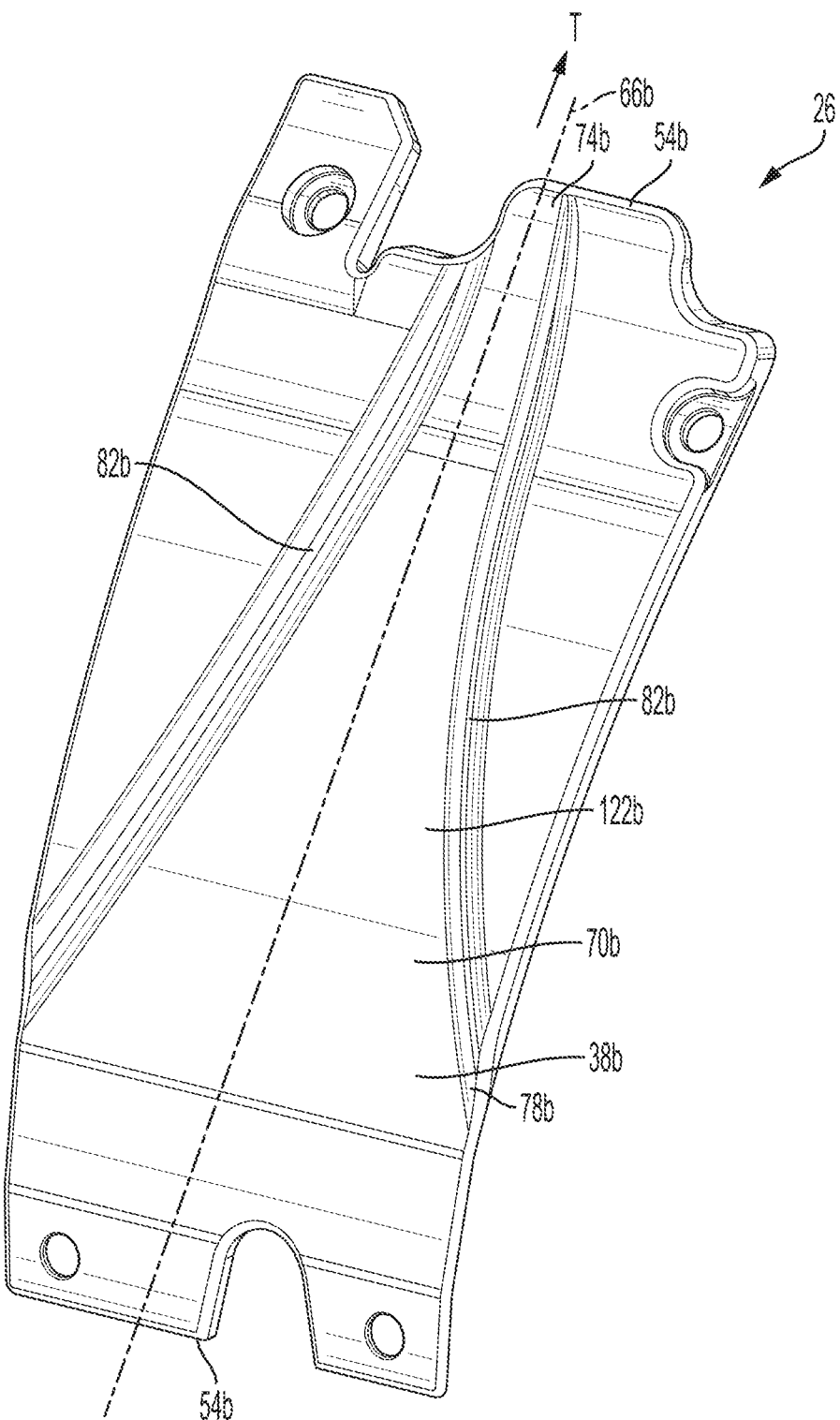
FIGS. 4A-4E illustrate a second implementation of a skid plate.
Figure 4B:
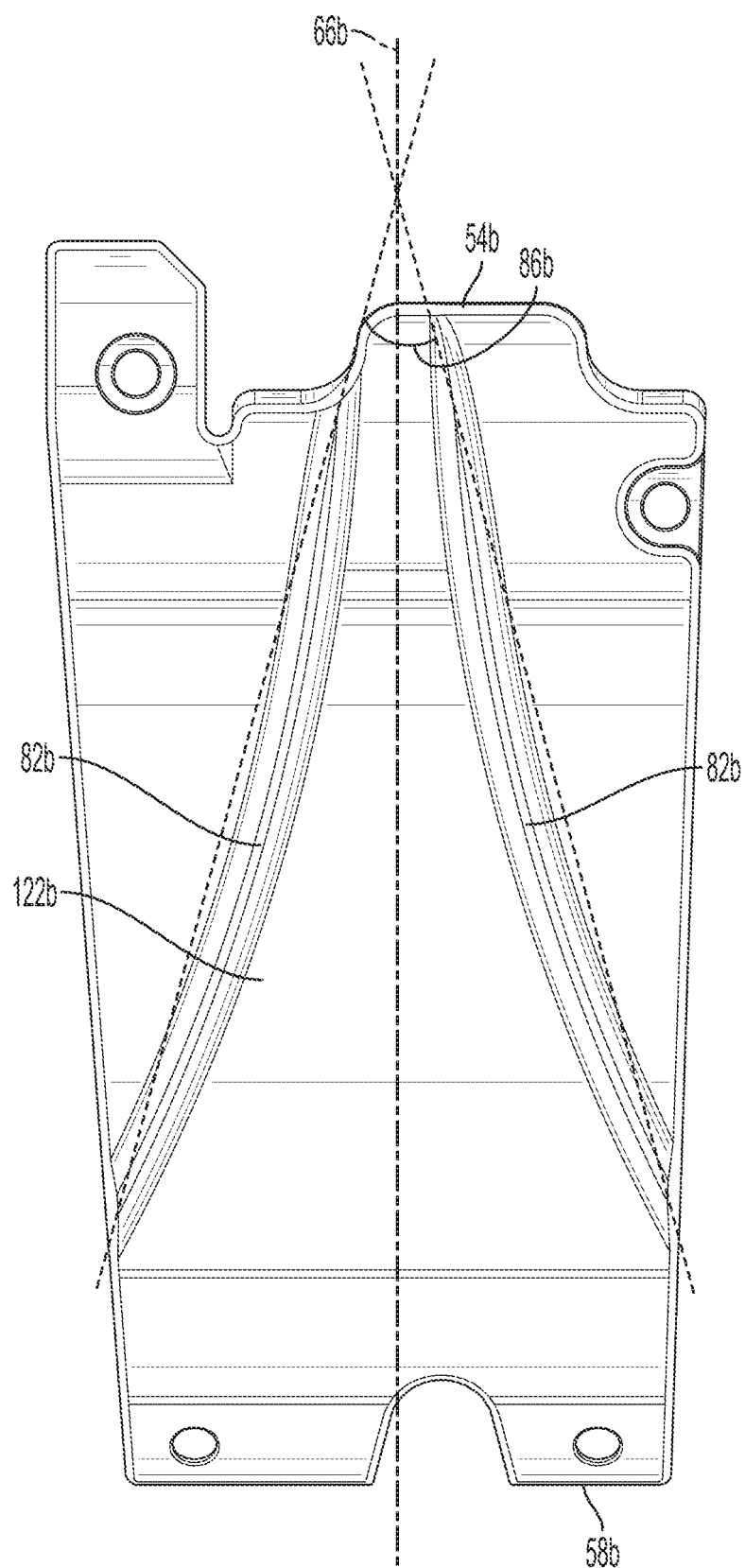
Figure 4C:
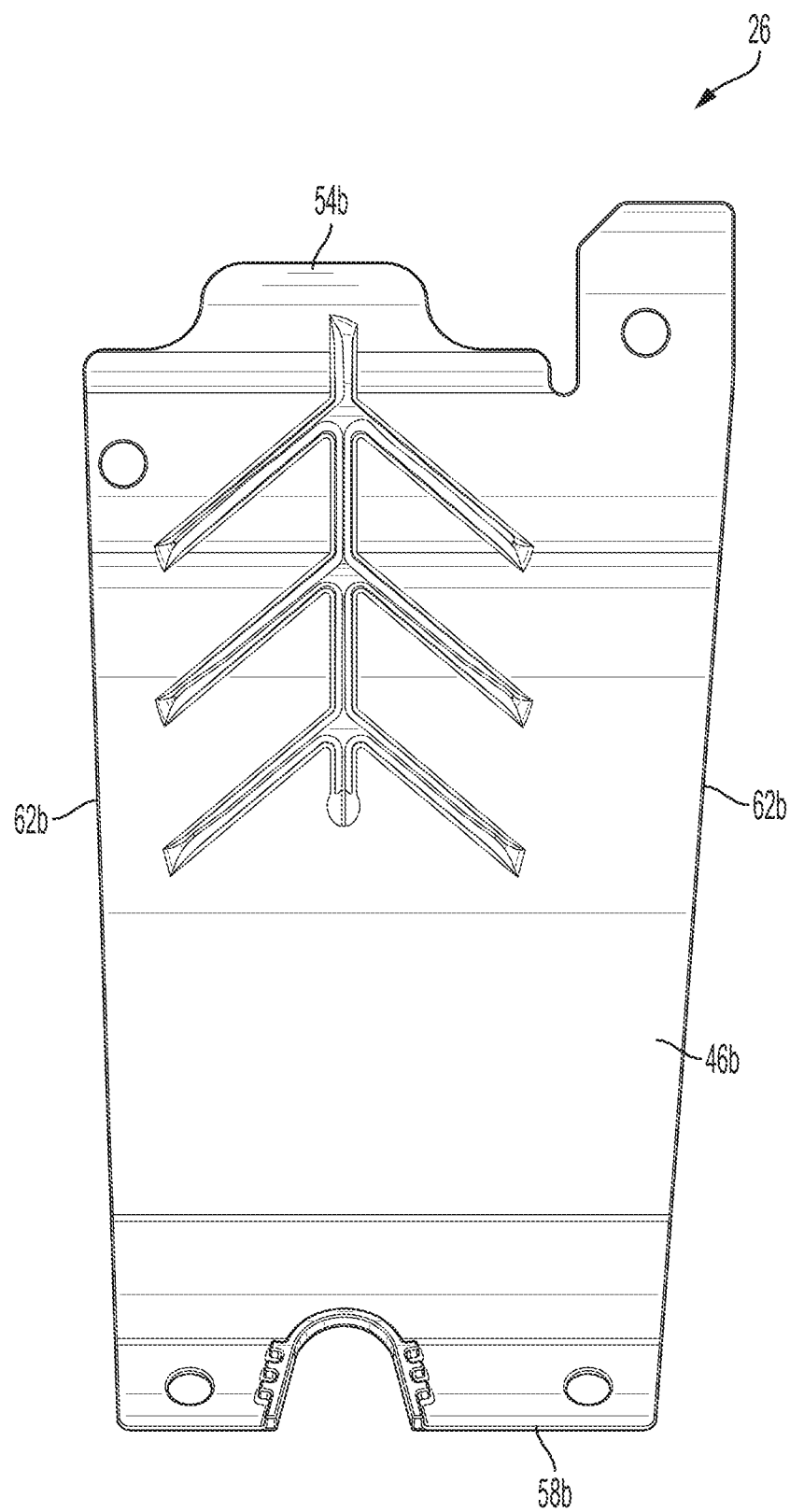
Figure 4D:
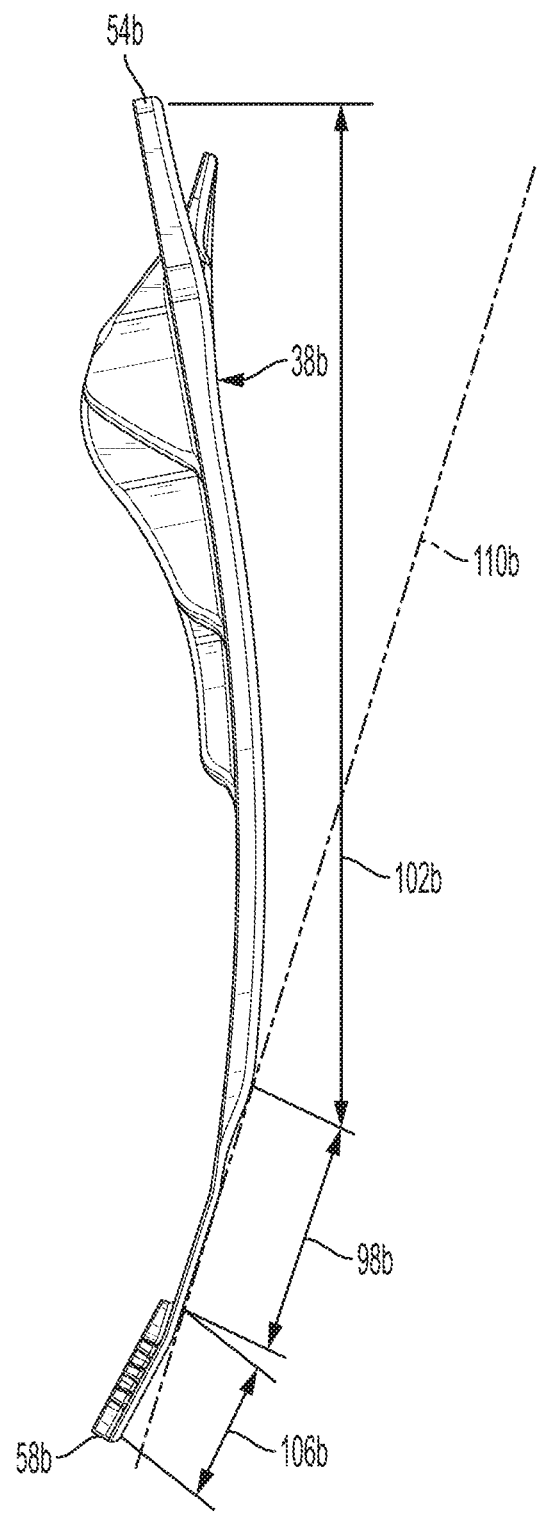
Figure 4E:
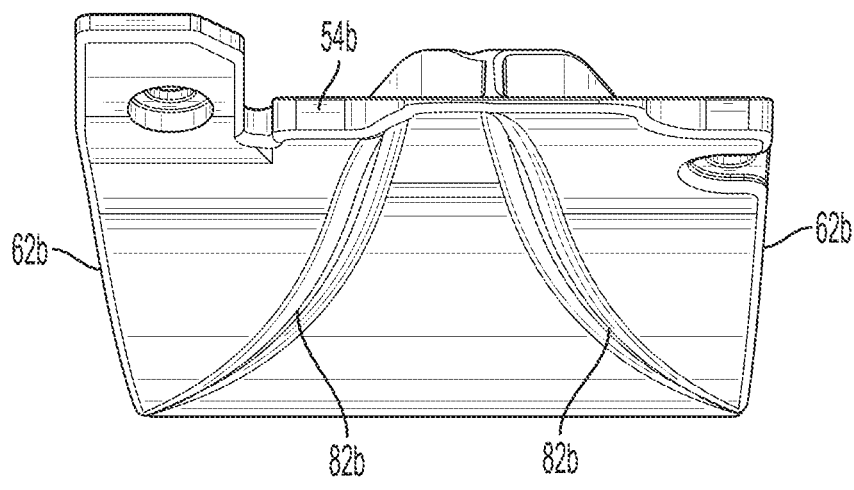

As shown in FIG. 4B, the sidewalls 82b of the groove 70b are not parallel to one another forming an average sidewall angle 86b of less than or equal to approximately 45 degrees. The sidewalls 82b are also curvilinear in shape such that the angle between the sidewalls 82b and the axis 66b vary as the sidewalls 86b extend away from the leading edge 54b (e.g., along the length of the axis 66b). More specifically, the angle between the sidewalls 82b and the axis 66b continuously increases as the sidewalls 86b extend away from the leading edge 54b.

As shown in FIG. 4A, the vertical contour of the sidewalls 82b includes at least a portion thereof that is perpendicular to the base wall 122b of the groove 70b as it transitions between the base wall 122b and the top surface 76b.

FIGS. 5A-5E illustrate another implementation of the contact surface 38c. The contact surface 38c is substantially similar to the contact surface 38 shown in FIGS. 3A-3E, as such, only the differences will be described herein with similar elements having a "c" suffix. The contact surface 38c presents a top surface that includes a pair of grooves, channels, or depressions 1000c, 1004c formed therein. Each groove 1000c, 1004c generally extends along the length of the contact surface 38c and includes a first end 74c proximate and open to the leading edge 54c, and a second end 78c proximate and open to the trailing edge 58c. Each groove 1000c, 1004c also defines a corresponding groove axis 1008c, 1012c extending along the length and positioned proximate the geometric center thereof. In the illustrated implementation, each groove axis 1008c, 1012c is substantially parallel to the axis 66c and spaced an equal distance therefrom. However, in alternative implementations the two groove axis 1008c, 1012c may be positioned at an angle with respect to one another (e.g., the grooves 1000c, 1004c extend toward or away from one another).

Figure 5A:
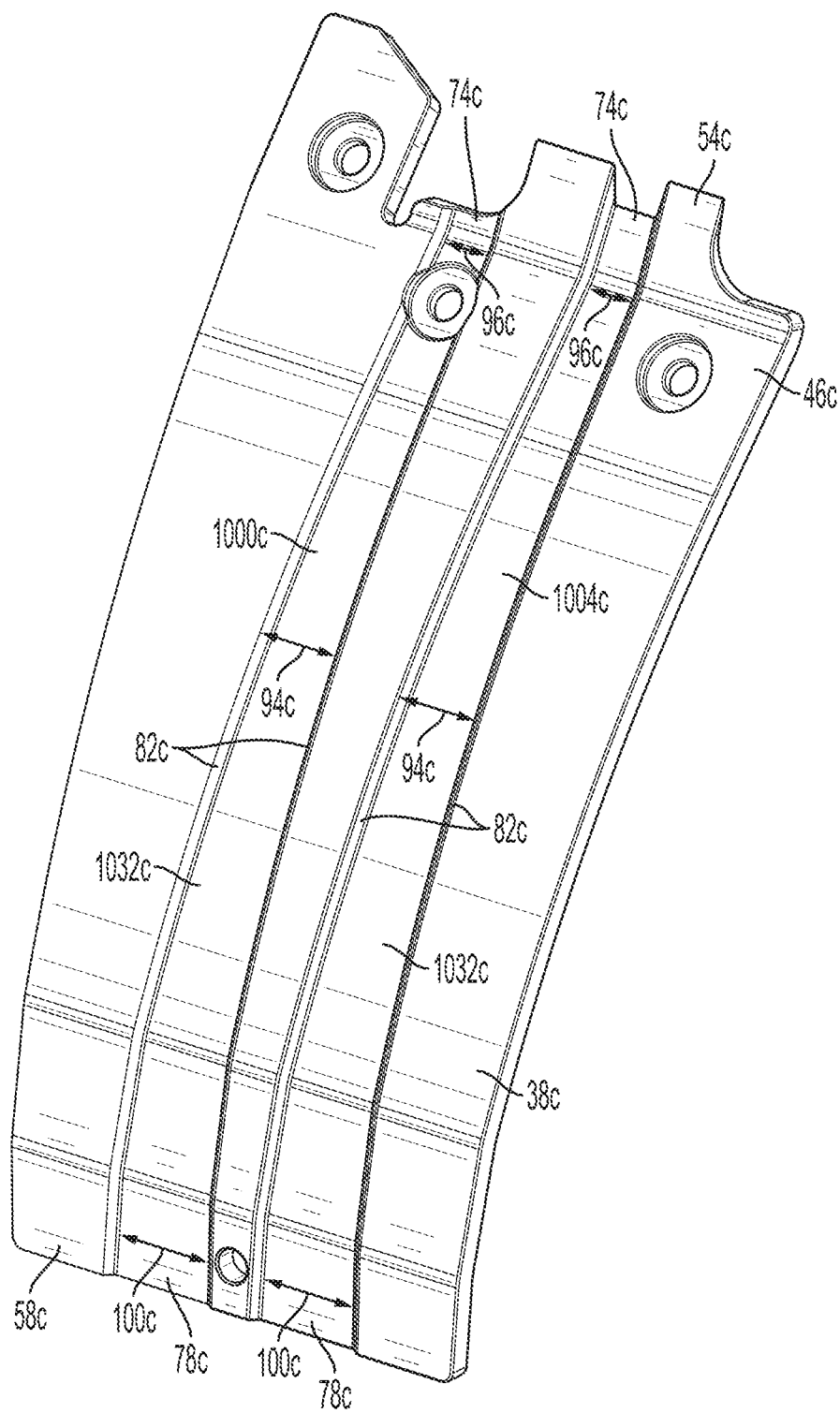
FIGS. 5A-5E illustrate a third implementation of a skid plate.
Figure 5B:
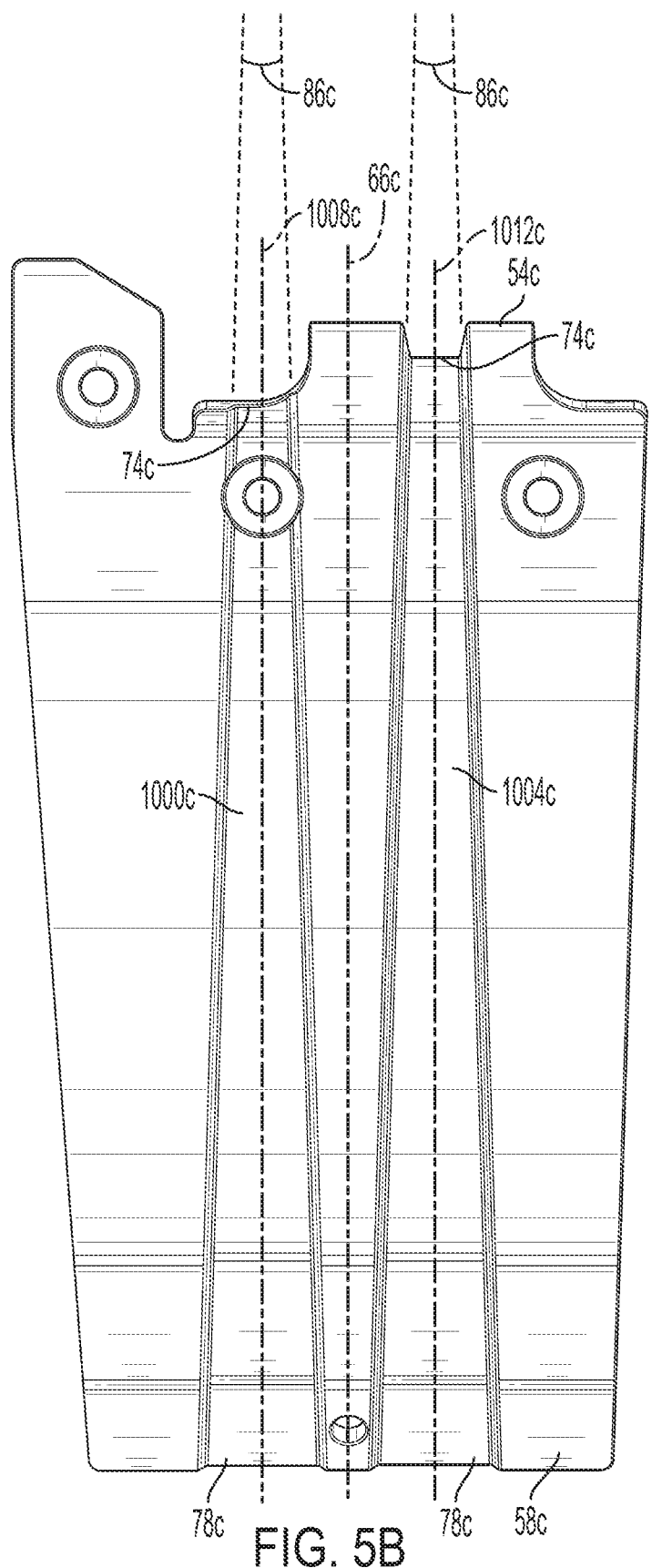
Figure 5C:
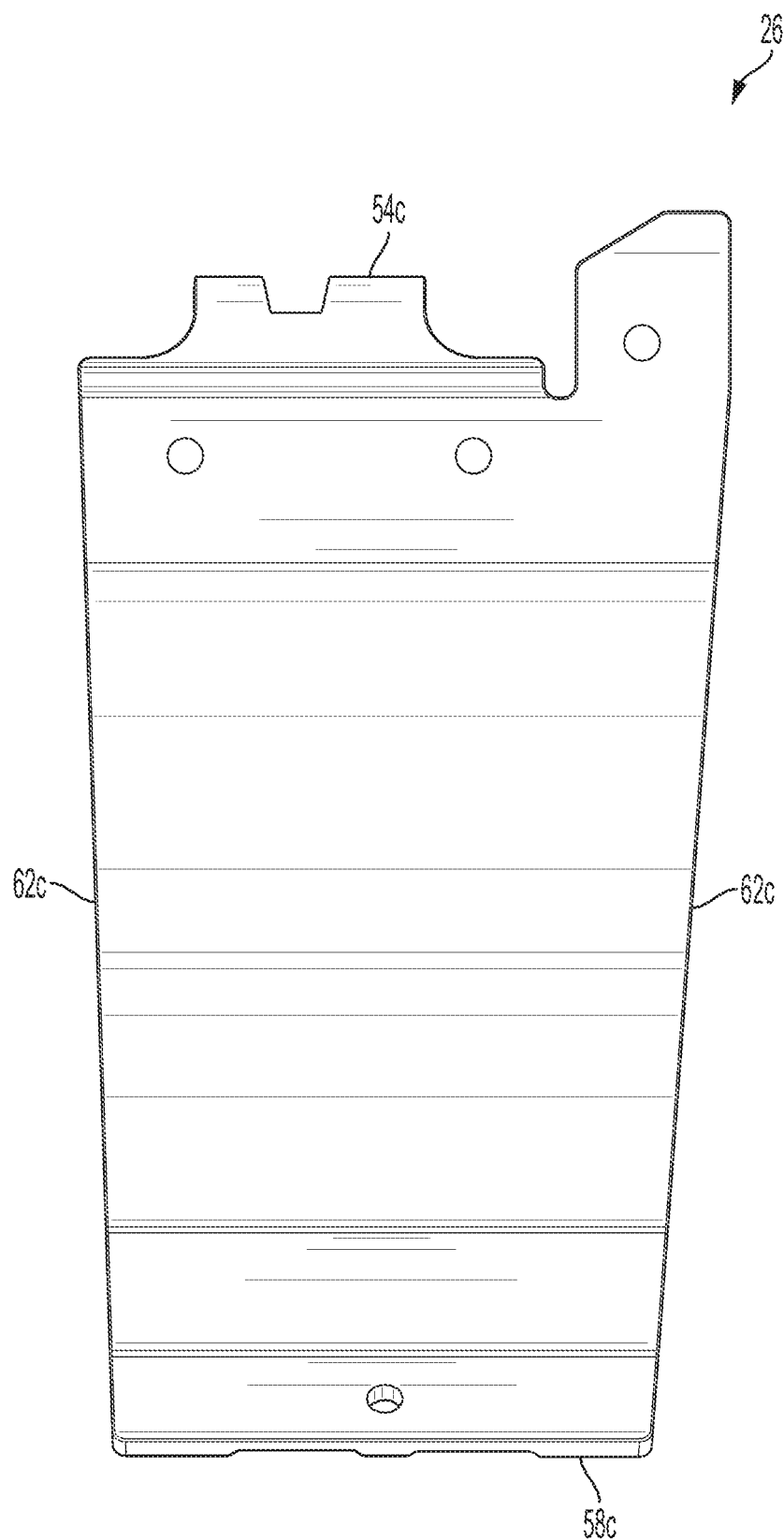
Figure 5D:
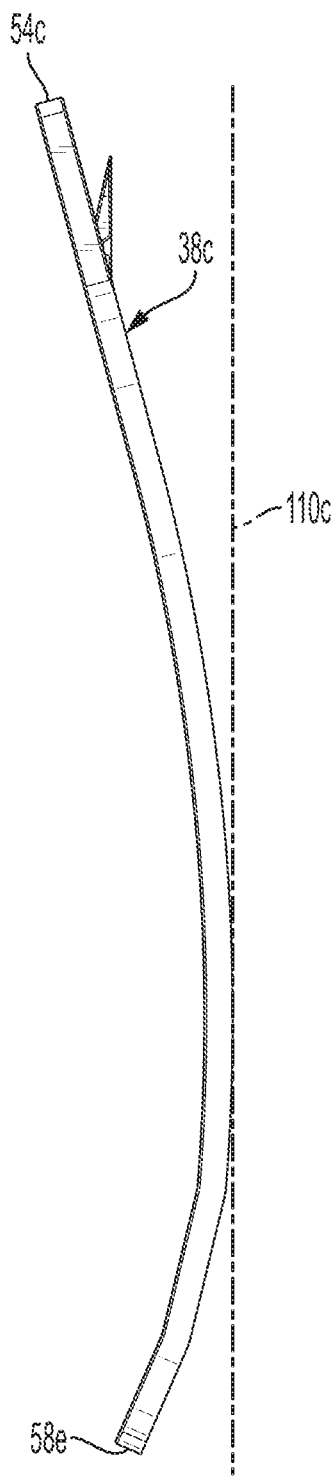
Figure 5E:
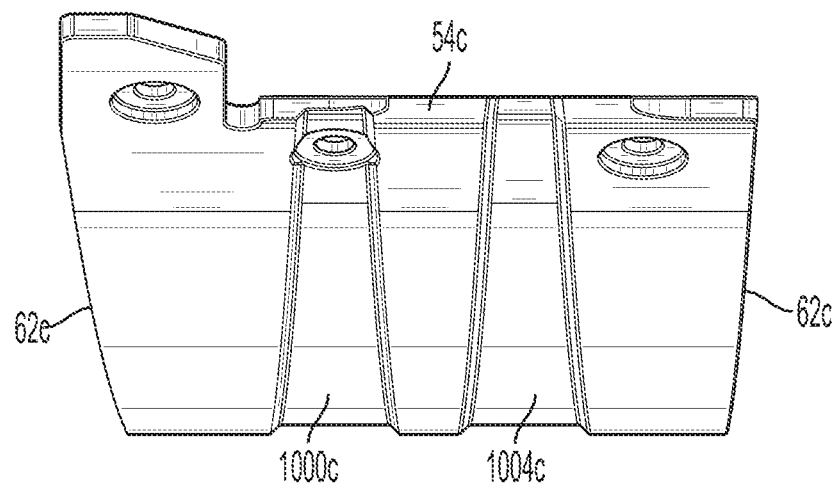

As shown in FIG. 5B, the sidewalls 82c of the grooves 1000c, 1004c are not parallel to one another forming an average sidewall angle 86c of less than or equal to approximately 15 degrees. In the illustrated implementation, the sidewall angle 86c of each groove 1000c, 1004c is substantially equal; however in alternative implementations, each groove 1000c, 1004c may define a unique sidewall angle 83c. The sidewalls 82c of each groove 1000c, 1004c are substantially linear in shape such that the angle between the sidewalls 82c and the axis 66c are constant as the sidewalls 86c extend away from the leading edge 54c (e.g., along the length of the axis 66c). The vertical contour of the sidewalls 82b of each groove 1000c, 1004c include at least a portion that are perpendicular to the base wall 1032b of the groove 70b.

Each groove 1000c, 1004c also defines a corresponding groove width 94c (see FIG. 5A). In the illustrated implementation, the groove widths 94c of each groove 1000c, 1004c increases as the grooves 1000c, 1004c extends away from the leading edge 54c (e.g., opposite the direction of travel T). Stated differently, each groove 1000c, 1004c defines a first width 96c proximate the first end 74c, and a second width 100c proximate the second end 78c that is larger than the first width 96c. While the illustrated implementation shows both grooves 1000c, 1004c having similar sizes and shapes, it is to be understood that in some implementations one groove may have an increasing width while the second groove may have a decreasing width, or any other combination thereof.

Figure 6A:
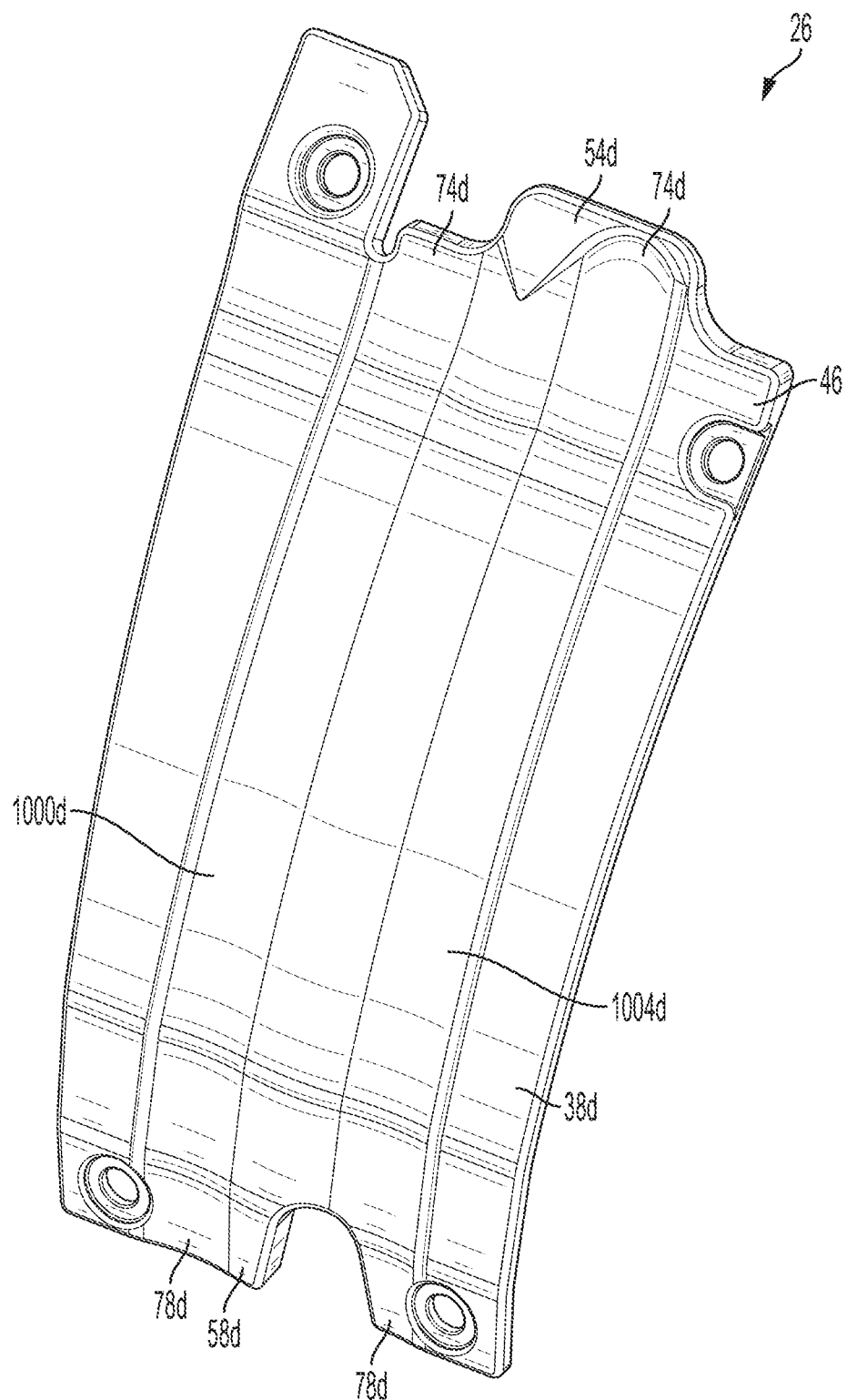
FIGS. 6A-6E illustrate a fourth implementation of a skid plate.
Figure 6B:
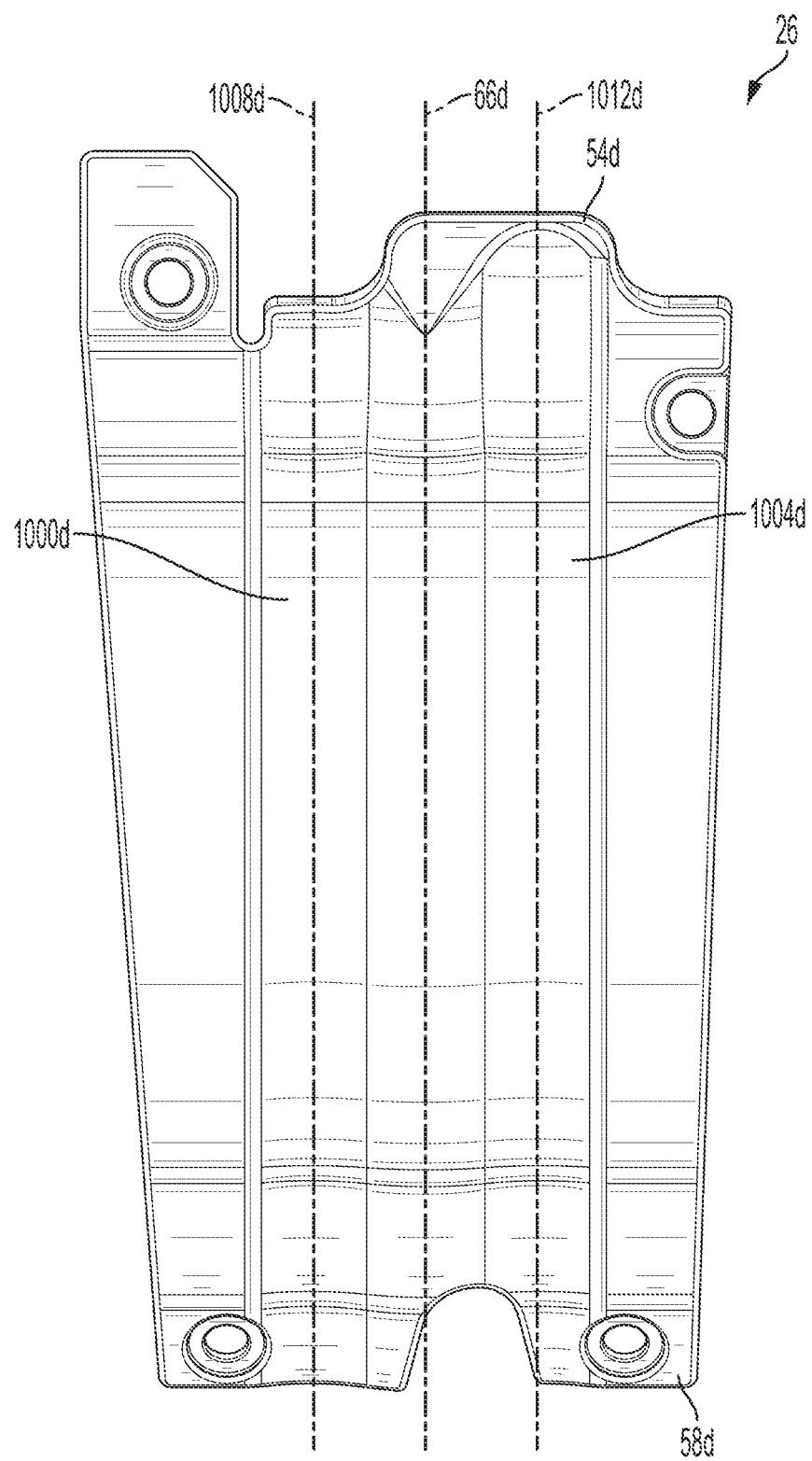
Figure 6C:
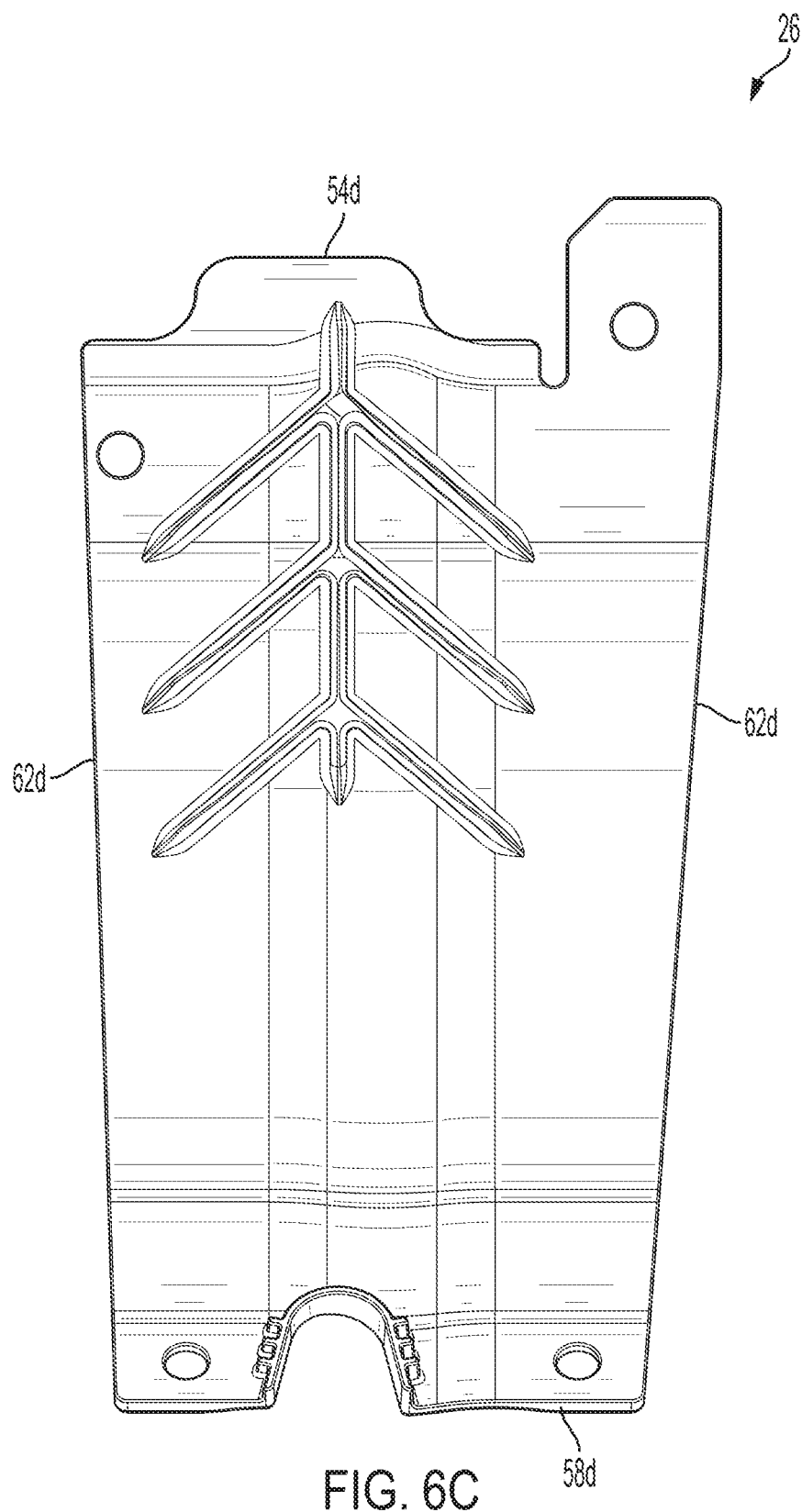
Figure 6D:
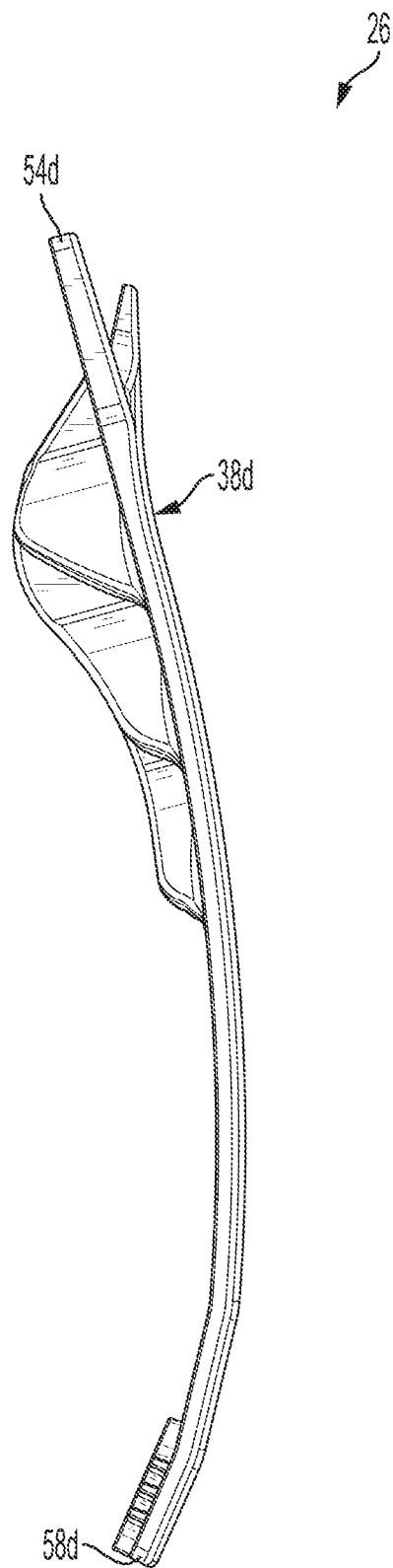
Figure 6E:
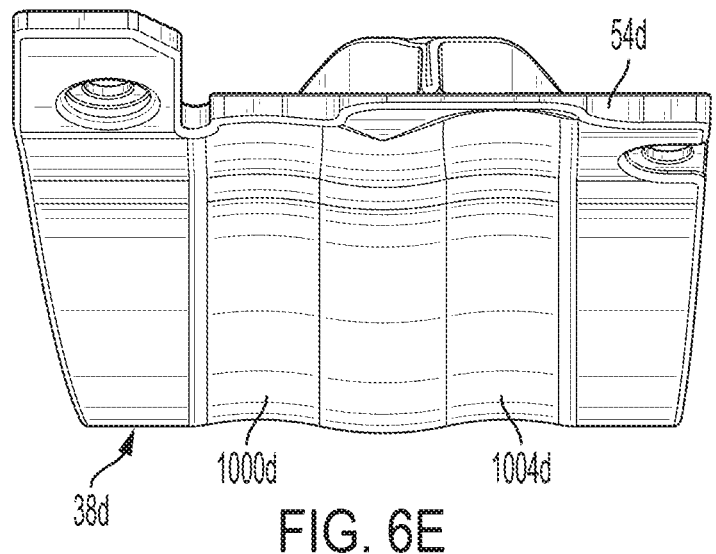
Figure 7A:
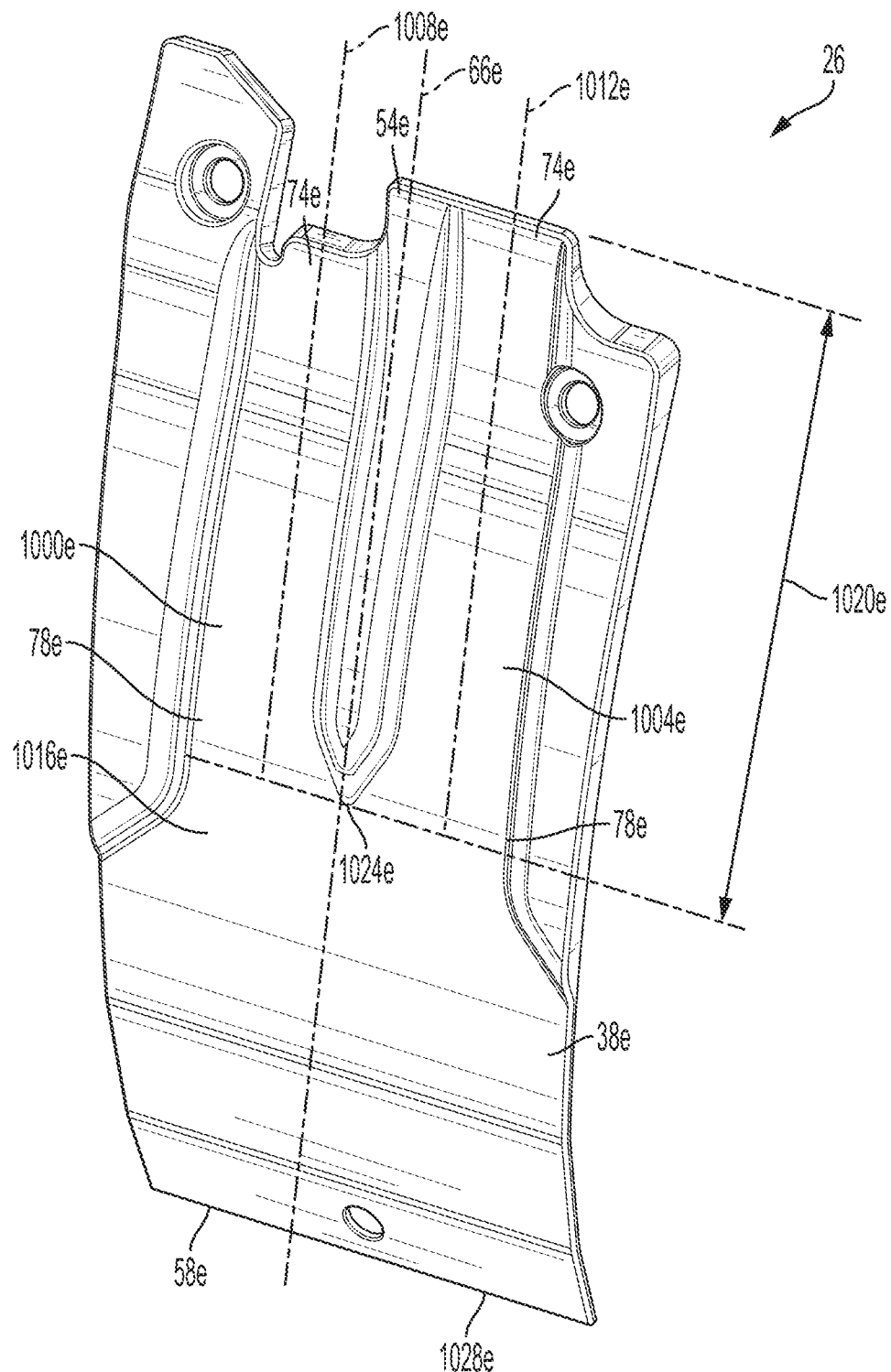
FIGS. 7A-7E illustrate a fifth implementation of a skid plate.
Figure 7B:
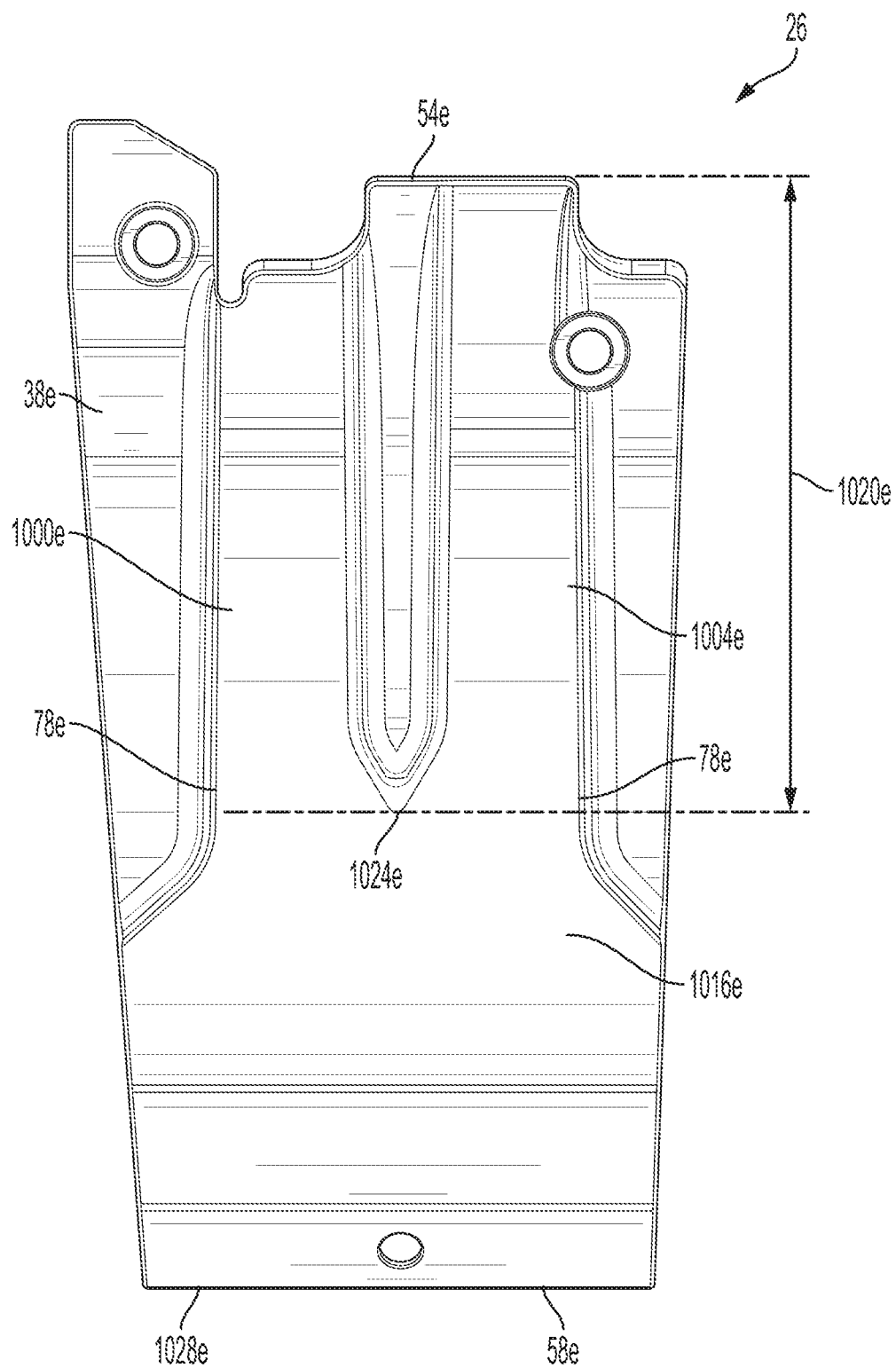
Figure 7C:
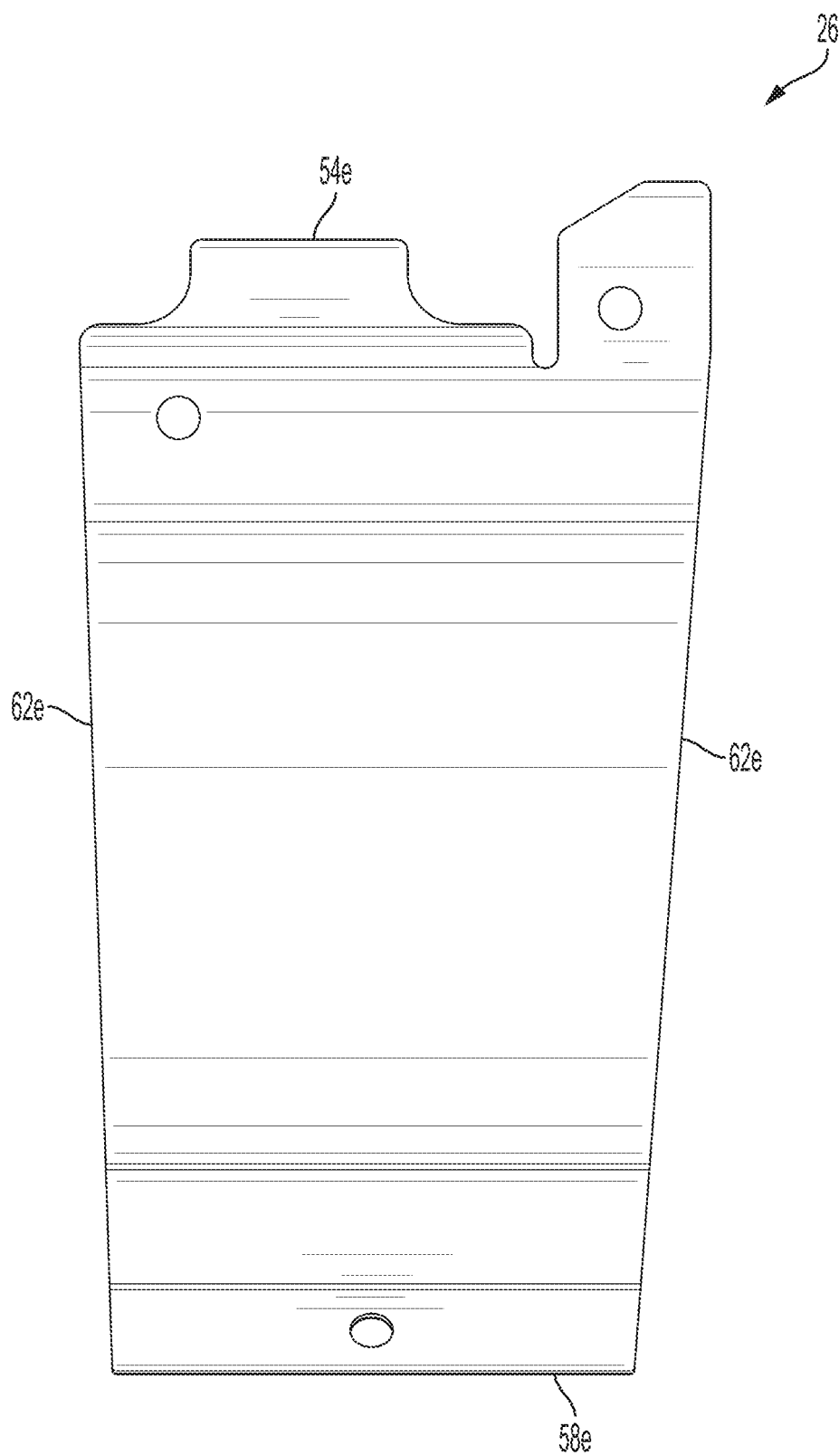
Figure 7D:
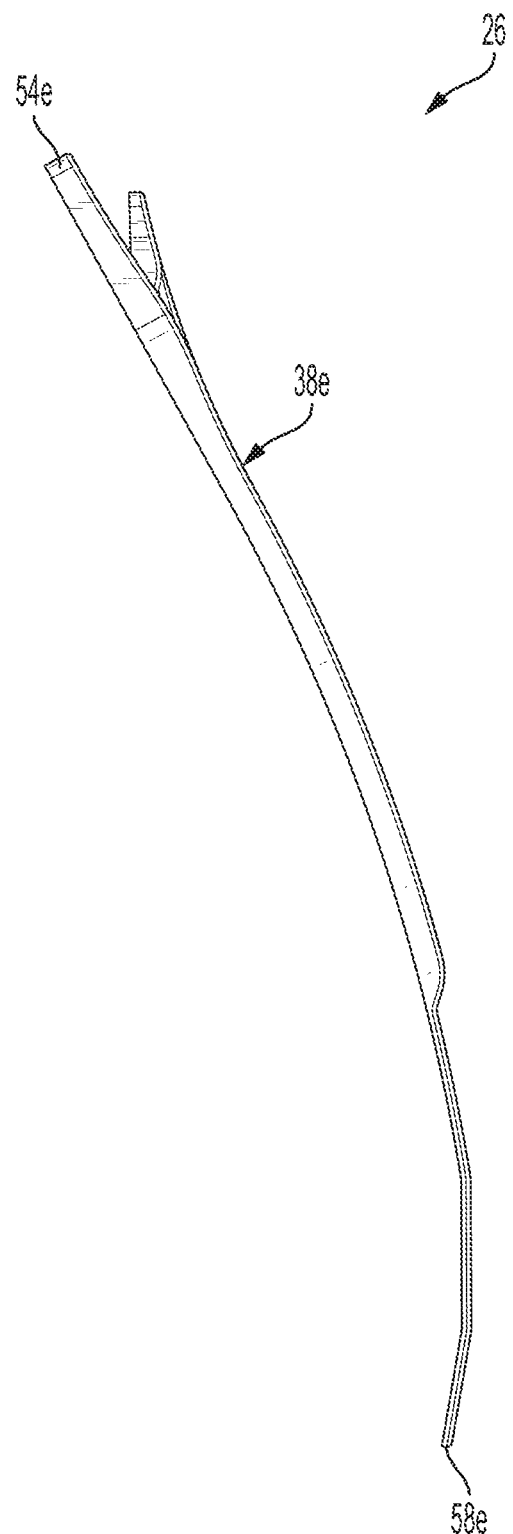
Figure 7E:
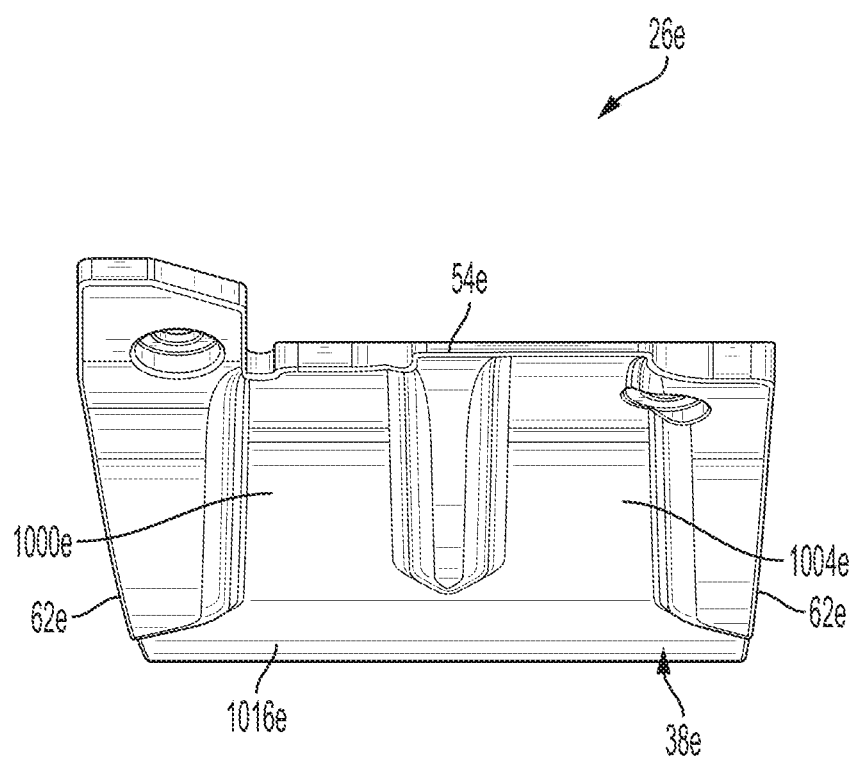

FIGS. 6A-6B illustrate another implementation of the contact surface 38d. The contact surface 38d is substantially similar to the contact surface 38c shown in FIGS. 5A-5E, as such, only the differences will be described herein with similar elements having a "d" suffix. The contact surface 38d presents a top surface that includes a pair of grooves, channels, or depressions 1000d, 1004d formed therein. Each groove 1000d, 1004d generally extends along the length of the contact surface 38d and includes a first end 74d proximate and open to the leading edge 54d, and a second end 78d proximate and open to the trailing edge 58d. Each groove 1000d, 1004d also defines a corresponding groove axis 1008d, 1012d extending along the length and positioned proximate the geometric center of each groove 1000d, 1004d, respectively. In the illustrated implementation, each groove axis 1008d, 1012d is substantially parallel to the axis 66c and spaced an equal distance therefrom.

Each groove 1000d, 1004d also includes a cross-sectional form that is substantially arcuate in shape. More specifically, the cross-sectional shape of the grooves 1000d, 1004d have a substantially constant arcuate radius. However, in alternative implementations different shapes or cross-sectional forms, such as rectangular, parabolic, hyperbolic, elliptical, and the like may be used.

FIGS. 7A-7E illustrate another implementation of the contact surface 38e. The contact surface 38e is substantially similar to the contact surface 38c shown in FIGS. 5A-5E, as such, only the differences will be described herein with similar elements having an "e" suffix. The contact surface 38e presents a top surface that includes a pair of grooves, channels, or depressions 1000e, 1004e each of which extend away from the leading edge 54e a first distance 1020e. The grooves 1000e, 1004e then merge together to form a single collection portion 1016e.

Each groove 1000e, 1004e generally extends along the length of the contact surface 38e and includes a first end 74e proximate and open to the leading edge 54e, a second end 78e positioned the first distance 1020e from the first end 74e. Each groove 1000e, 1004e also defines a corresponding groove axis 1008e, 1012e extending along the length and positioned proximate the geometric center thereof. In the illustrated implementation, each groove axis 1008e, 1012e is substantially parallel to the axis 66e and spaced an equal distance therefrom. However, in alternative implementations the two groove axis 1008e, 1012e may be positioned at an angle with respect to one another (e.g., the grooves 1000e, 1004e extend toward or away from one another).

The collection portion 1016e of the contact surface 36e includes a first end 1024e open to both grooves 1000e, 1004e, and a second end 1028e proximate and open to the trailing edge 58e. In the illustrated implementation, the collection portion 1016e includes a base wall 1032e that is substantially aligned with the base walls 1036f of the two grooves 1000e, 1004e to form a substantially smooth and continuous transition therebetween.

While the illustrated contact surface 38e includes two grooves 1000e, 1004e that merge into a single collection portion 1016e, in alternative implementations more grooves (not shown) may be present and merge into a single collection portion 1016e. In still other implementations, multiple subsets of two or more grooves may collect into multiple separate collection portions (not shown).

Figure 8A:
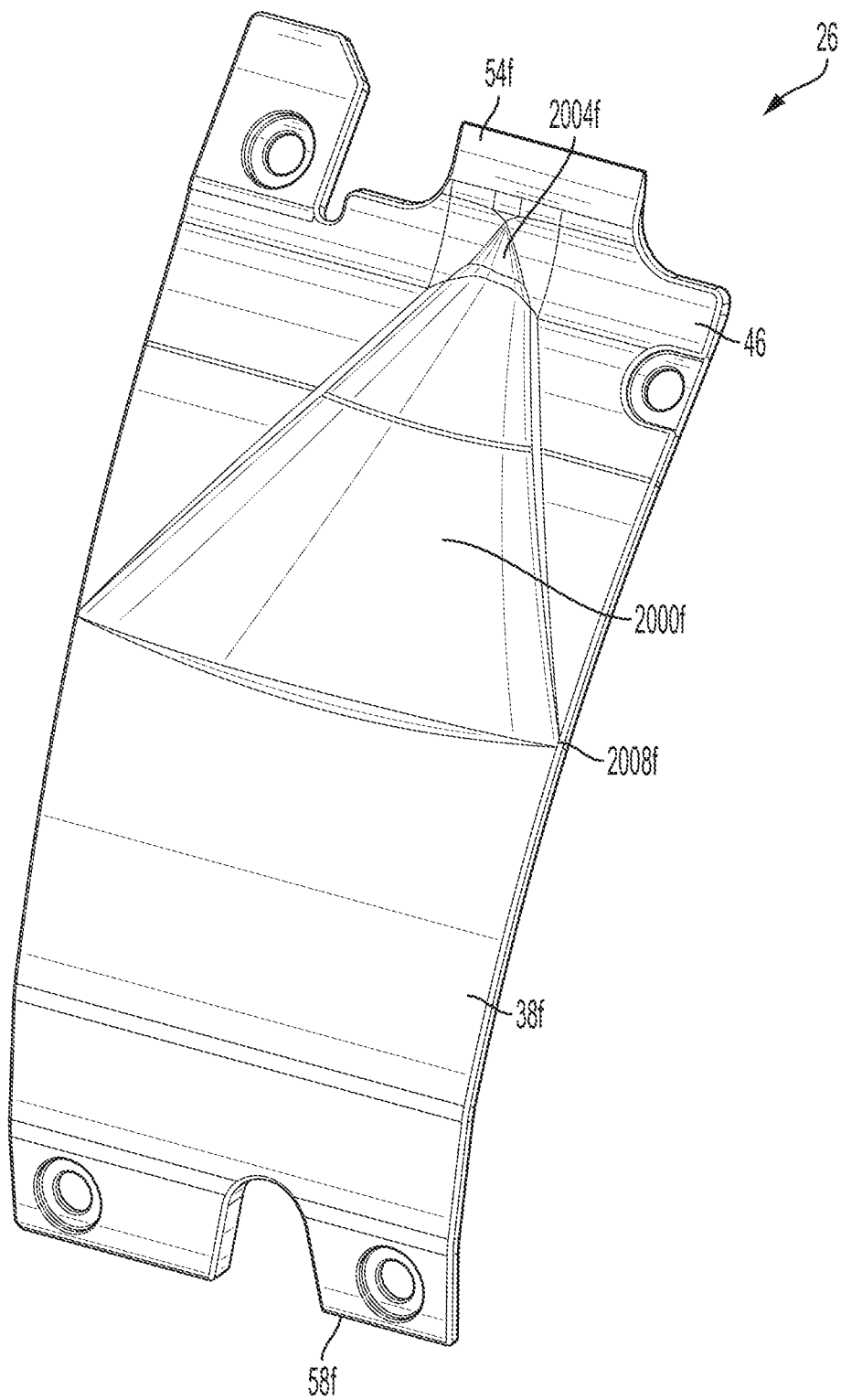
FIGS. 8A-8E illustrate a sixth implementation of a skid plate.
Figure 8B:
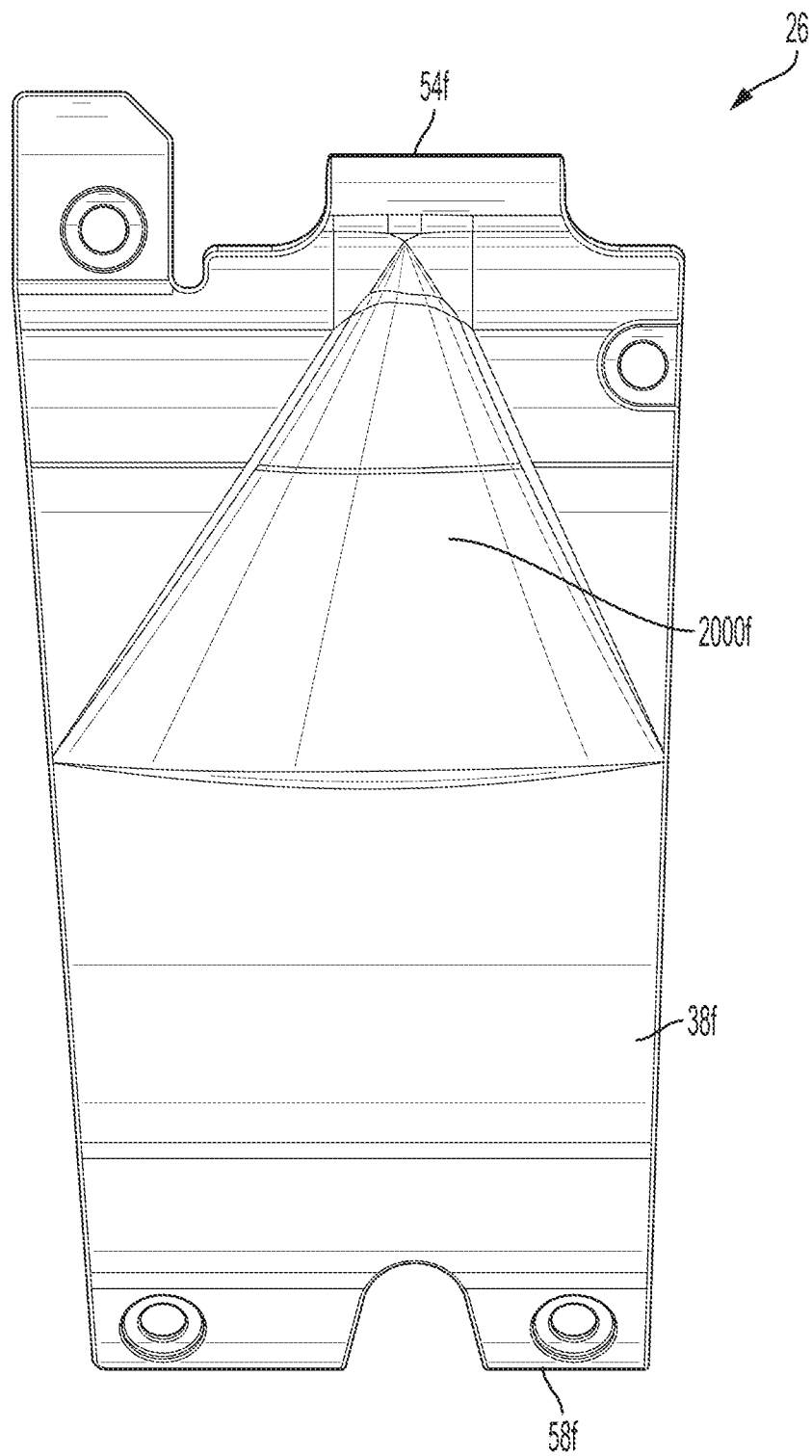
Figure 8C:
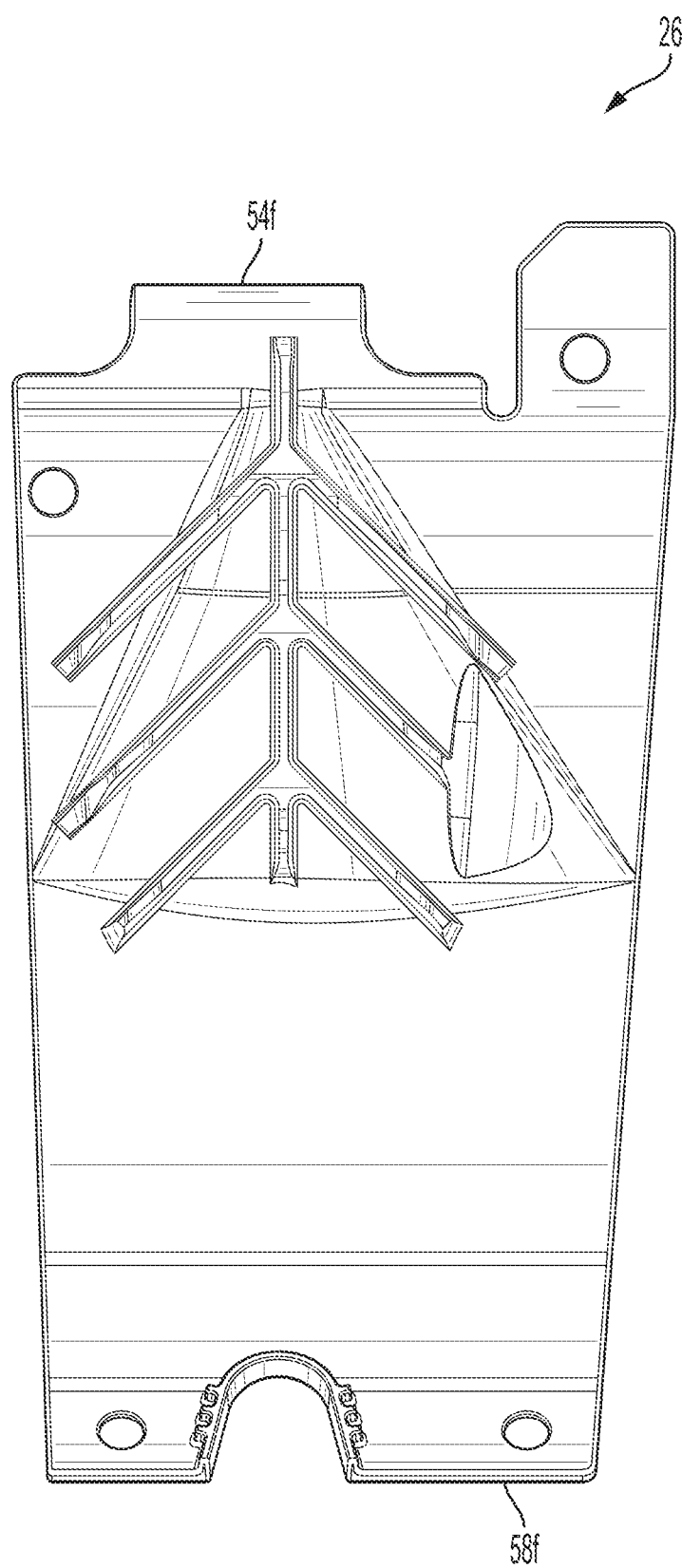
Figure 8D:
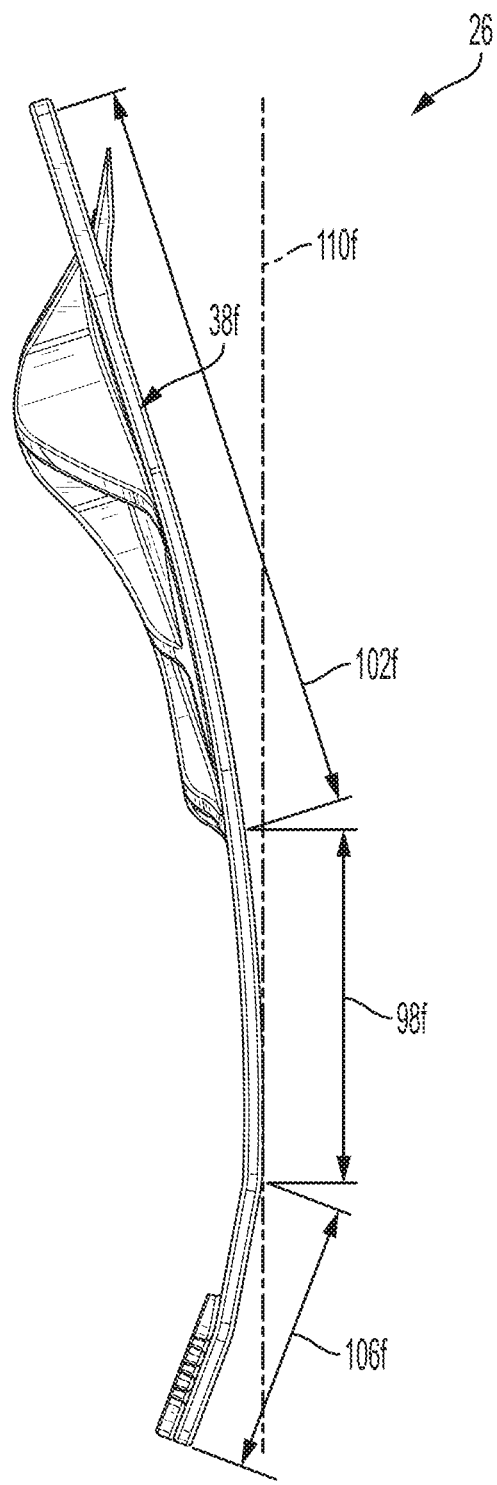
Figure 8E:
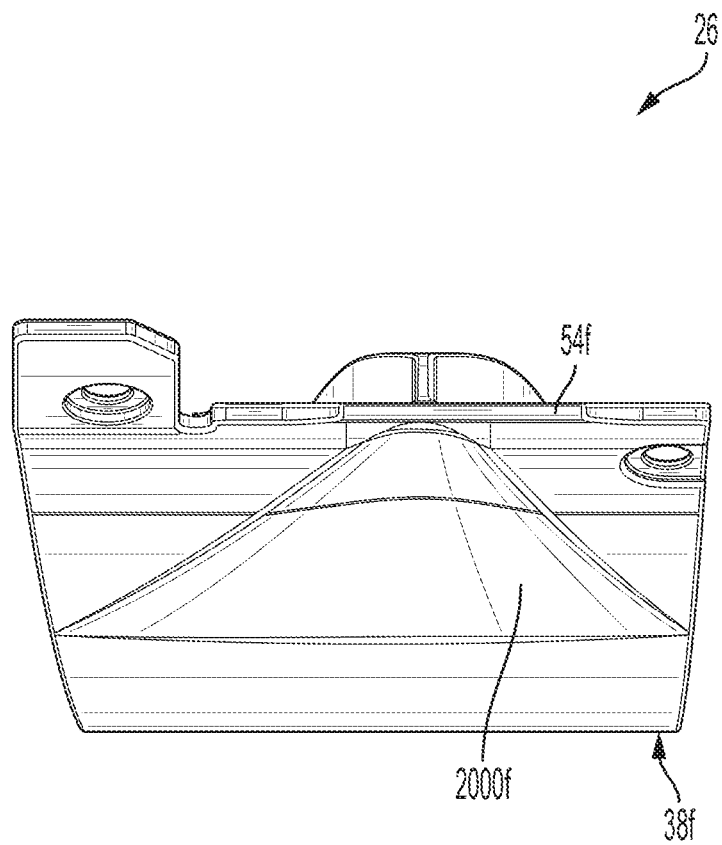

FIGS. 8A-8B illustrate another implementation of the contact surface 38f. The contact surface 38f is substantially similar to the contact surface 38 shown in FIGS. 3A-3E, as such, only the differences will be described herein with similar elements having an "f" suffix. The contact surface 38f presents a top surface that includes a depression 2000f formed therein to produce adjacent elevated surface 2012f. The depression 2000f is substantially conical in shape having a first end 2004f proximate and open to the leading edge 54f, and a second end 2008f spaced a distance from the first end 2004f opposite the direction of travel T (e.g., further away from the leading edge 54f). In the illustrated implementation, the second end 2008f of the depression 2000f is positioned between the leading edge 54f and the contact zone 98f (described above) of the contact surface 38f; however in alternative implementations, the second end 2008f may be positioned anywhere along the length of the contact surface 38f as desired.

Figure 9A:
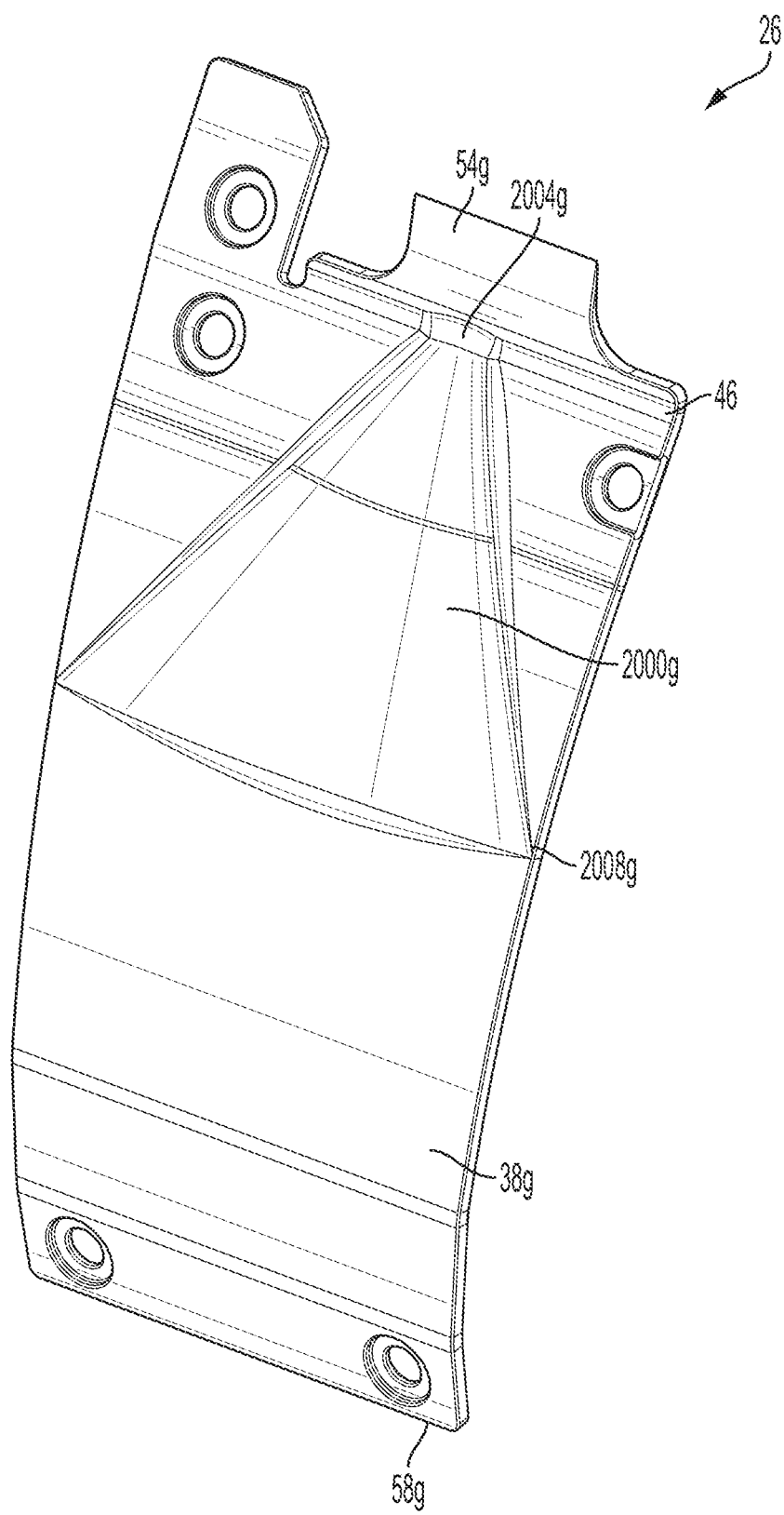
FIGS. 9A-9E illustrate a seventh implementation of a skid plate.
Figure 9B:
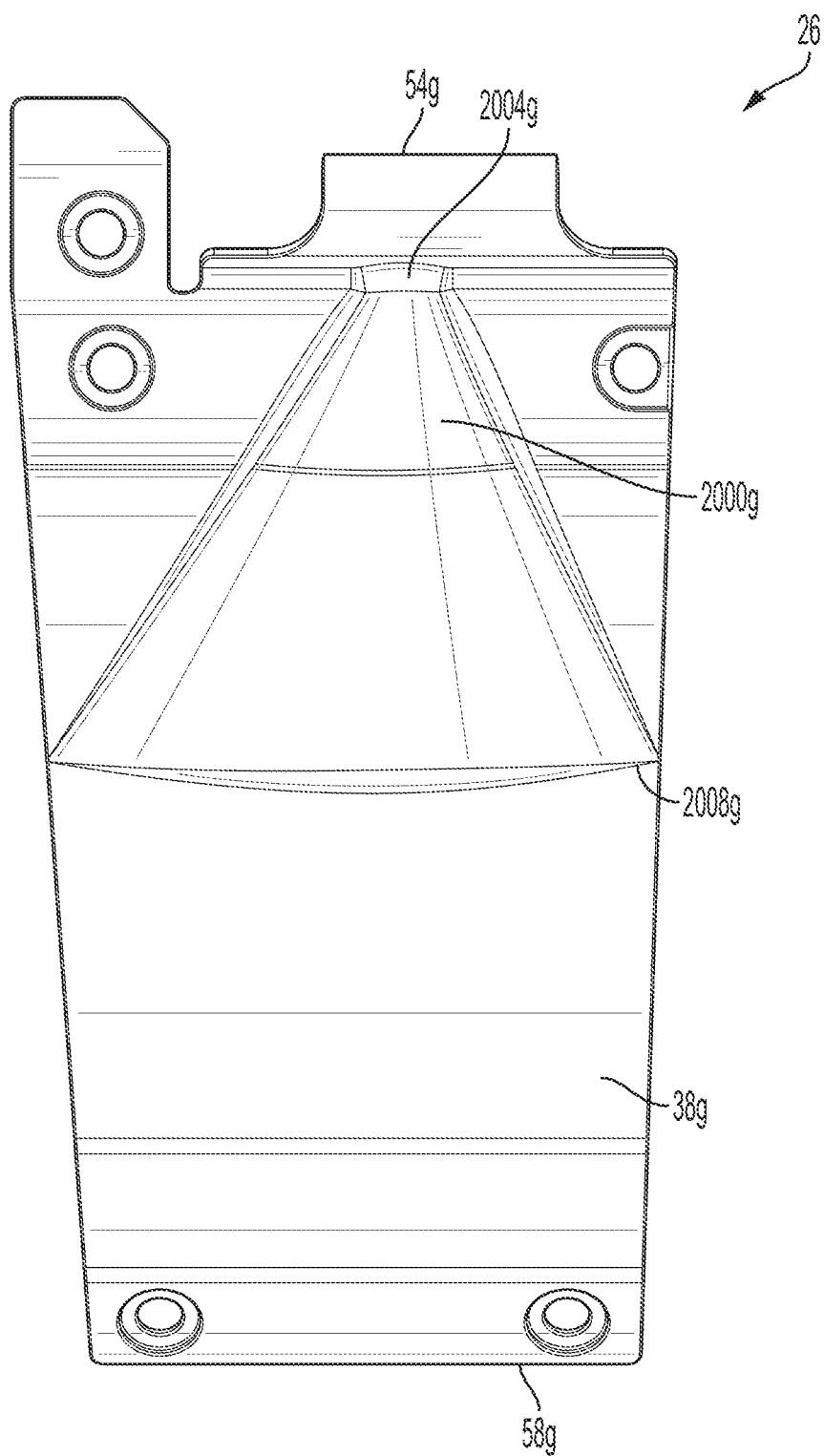
Figure 9C:
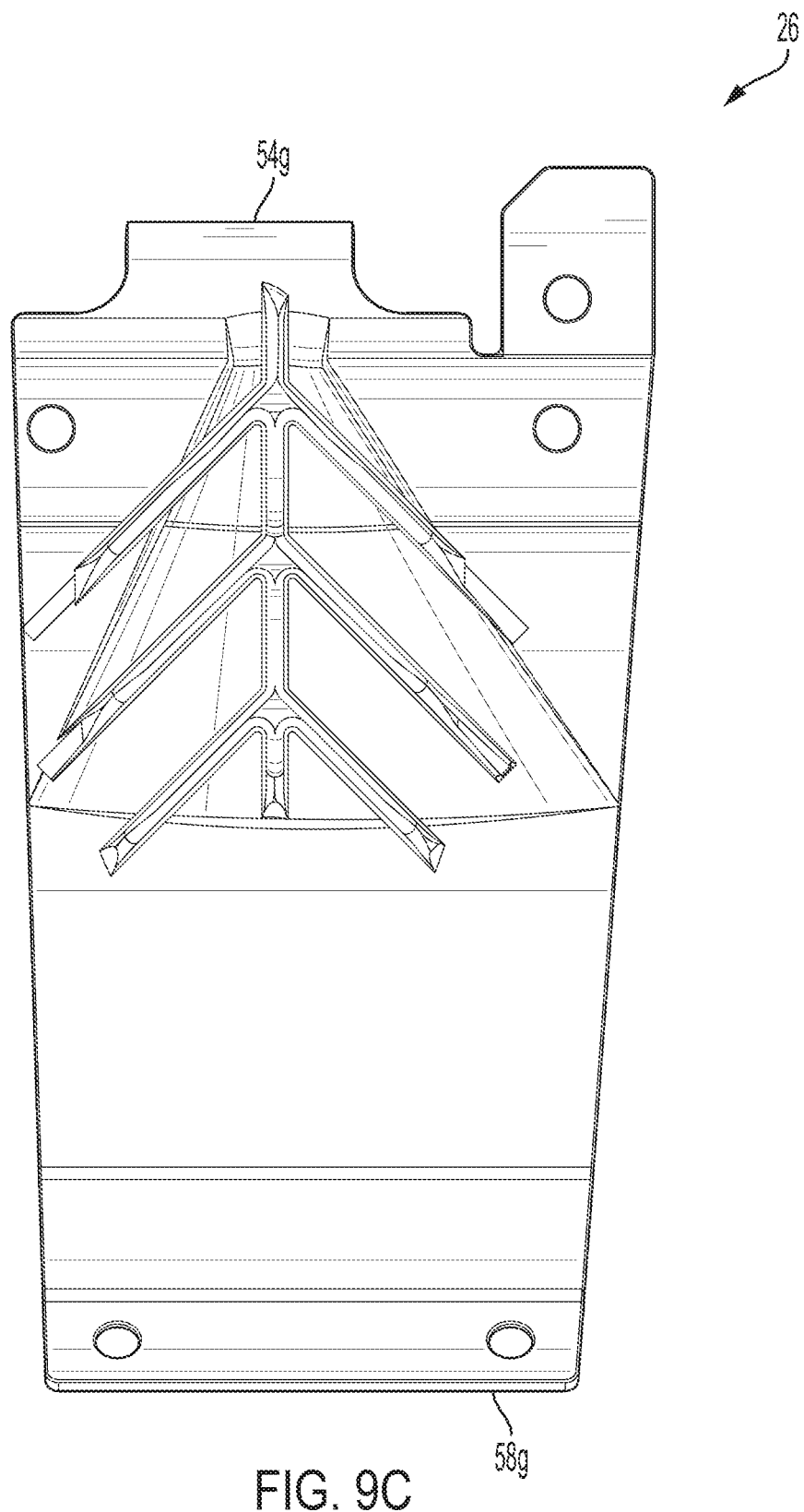
Figure 9D:
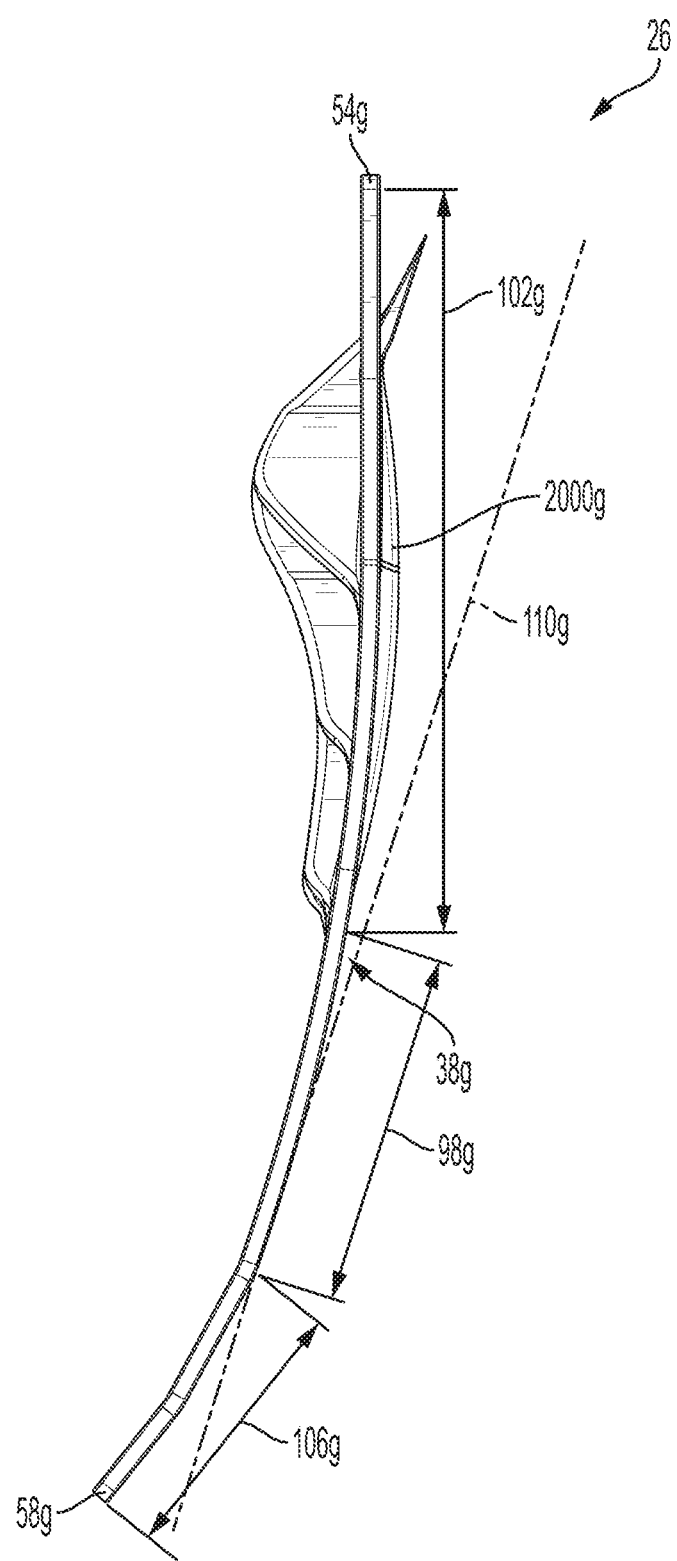
Figure 9E:
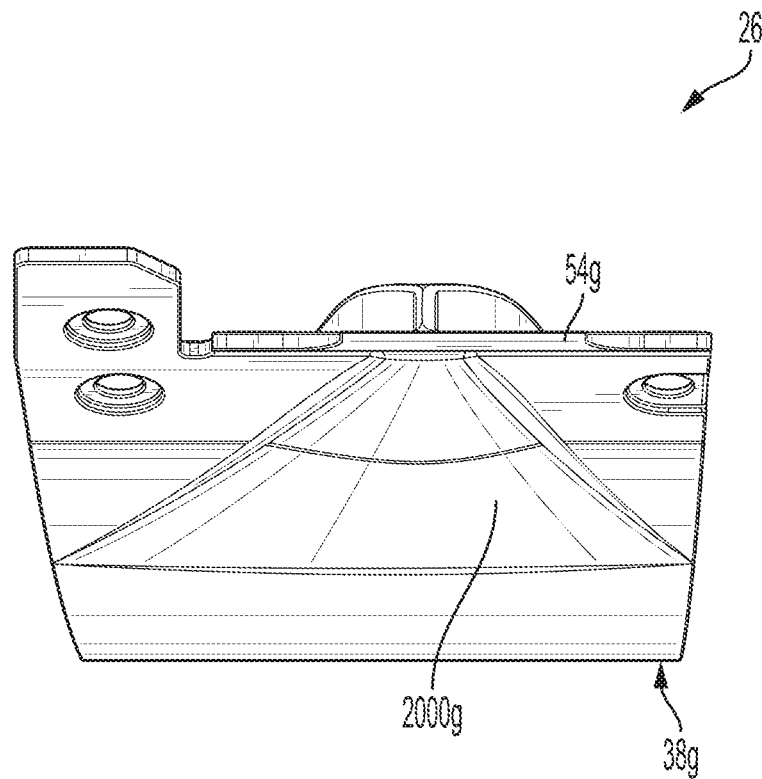

FIGS. 9A-9B illustrate another implementation of the contact surface 38g. The contact surface 38g is substantially similar to the contact surface 38f shown in FIGS. 8A-8E, as such, only the differences will be described herein with similar elements having a "g" suffix. The contact surface 38g presents a top surface that includes a protrusion 2000f extending outwardly therefrom to produce adjacent depressed surfaces 2016g. The depression 2000g is substantially conical in shape having a first end 2004g proximate and open to the leading edge 54g, and a second end 2008g spaced a distance from the first end 2004g opposite the direction of travel T (e.g., further away from the leading edge 54g). In the illustrated implementation, the second end 2008g of the depression 2000g is positioned between the leading edge 54g and the contact zone 98g (described above)

of the contact surface 38*g*; however in alternative implementations, the second end 2008*g* may be positioned anywhere along the length of the contact surface 38*g* as desired.

FIGS. 10A-10E illustrate another implementation of the contact surface 38*h*. The contact surface 38*h* is substantially similar to the contact surface 38 shown in FIGS. 3A-3E, as such, only the differences will be described herein with similar elements having a "c" suffix. The contact surface 38*h* presents a top surface that includes a pair of grooves 1000*h*, 1004*h* formed therein. Each groove 1000*h*, 1004*h* generally extends along the length of the contact surface 38*h* and includes a first end 74*h* proximate and open to the leading edge 54*h*, and a second end 78*h* proximate the trailing edge 58*h*. Each groove 1000*h*, 1004*h* also defines a corresponding groove axis 1008*h*, 1012*h* extending along the length and positioned proximate the geometric center thereof. In the illustrated implementation, each groove axis 1008*h*, 1012*h* is substantially parallel to the axis 66*h* and spaced an equal distance therefrom. However, in alternative implementations the two groove axis 1008*h*, 1012*h* may be positioned at an angle with respect to one another (e.g., the grooves 1000*h*, 1004*h* extend toward or away from one another).

Figure 10A:
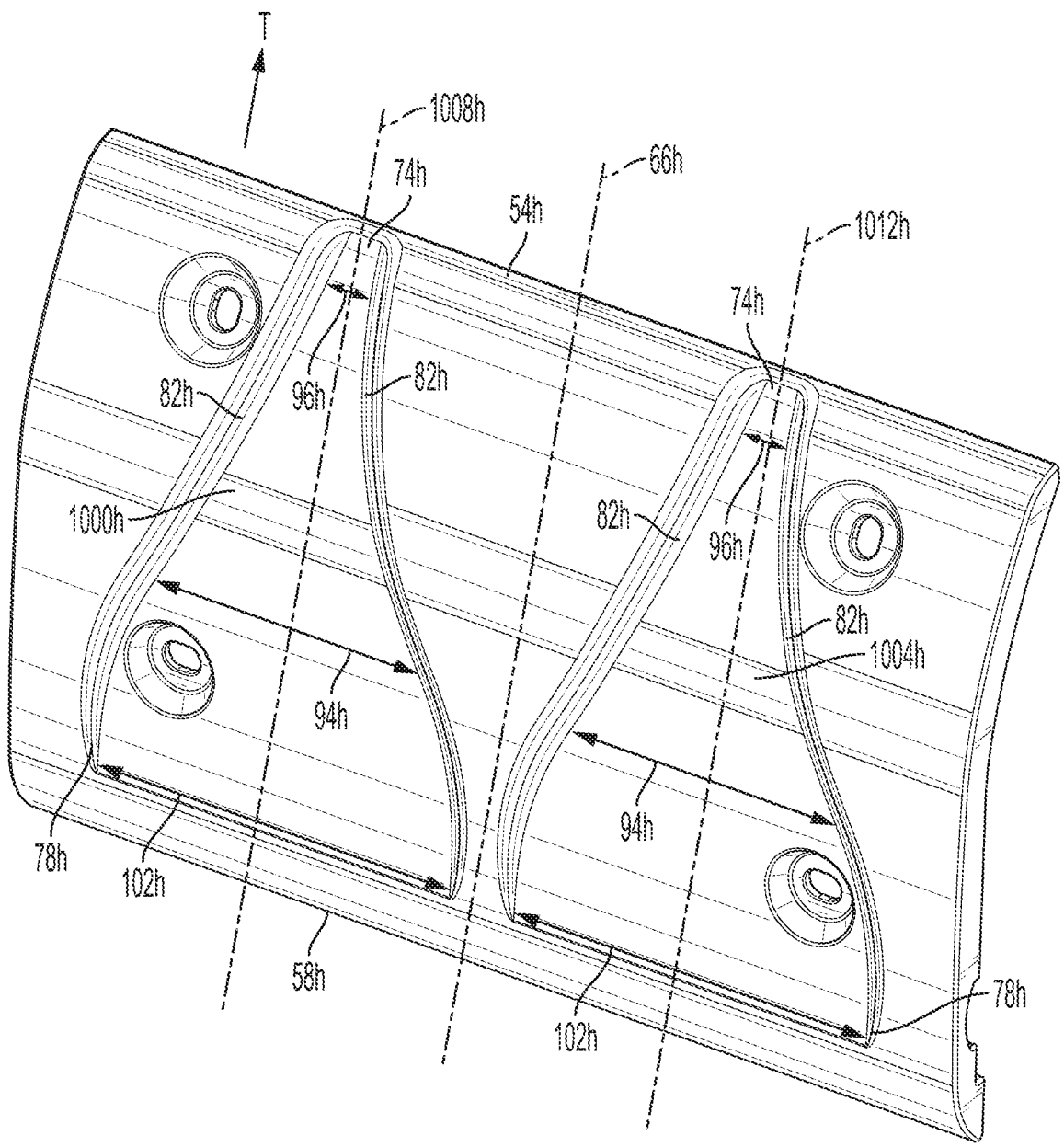
FIGS. 10A-10E illustrate a eighth implementation of a skid plate.
Figure 10B:
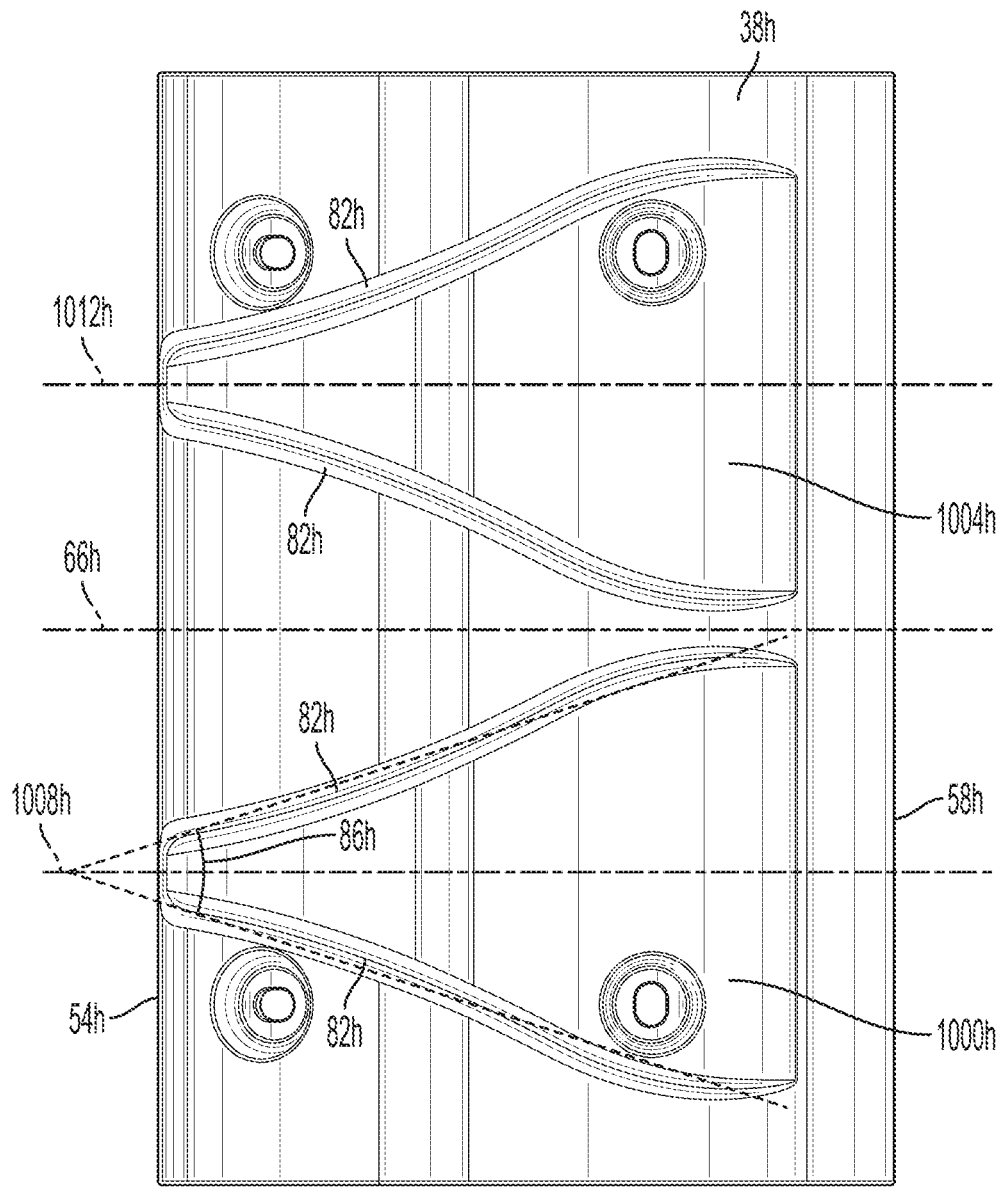
Figure 10C:
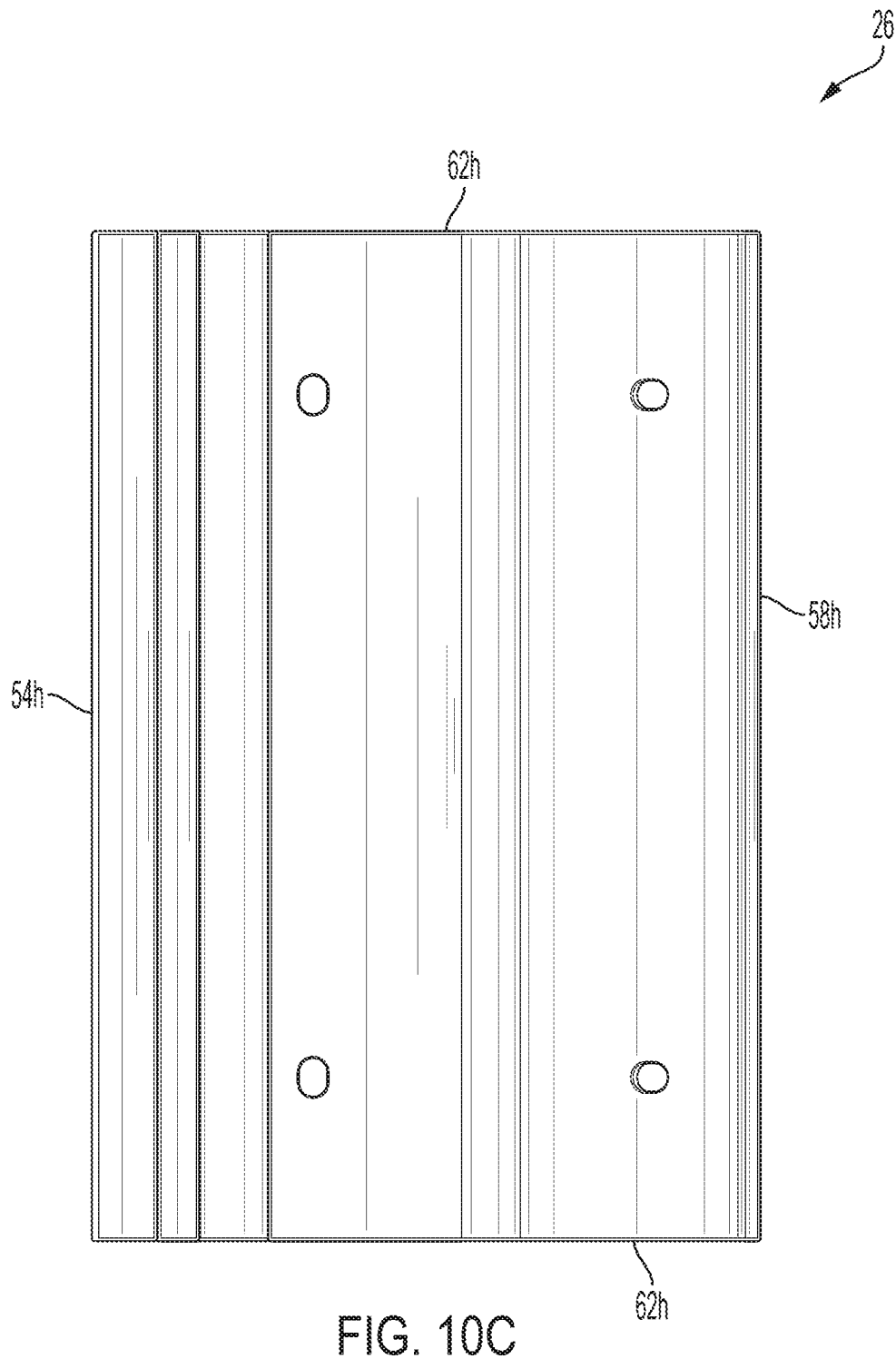
Figure 10D:
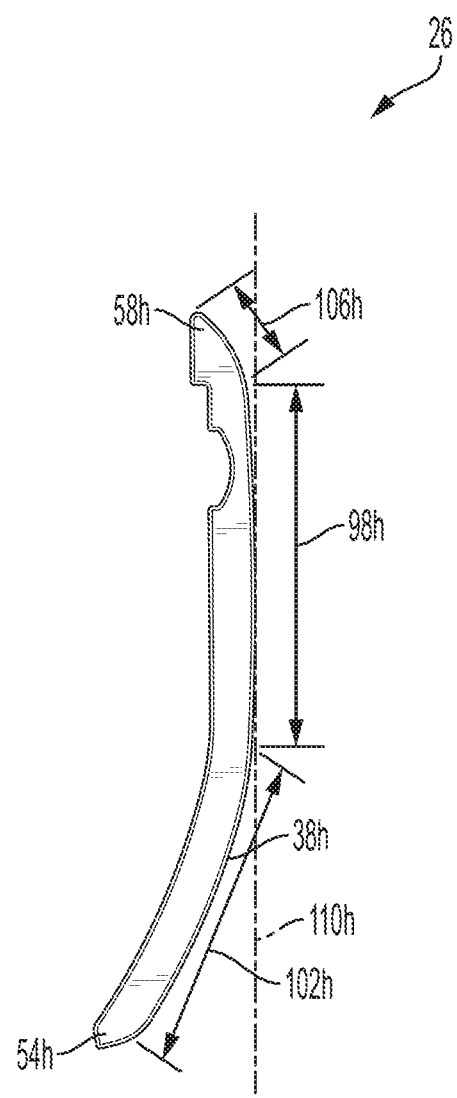
Figure 10E:
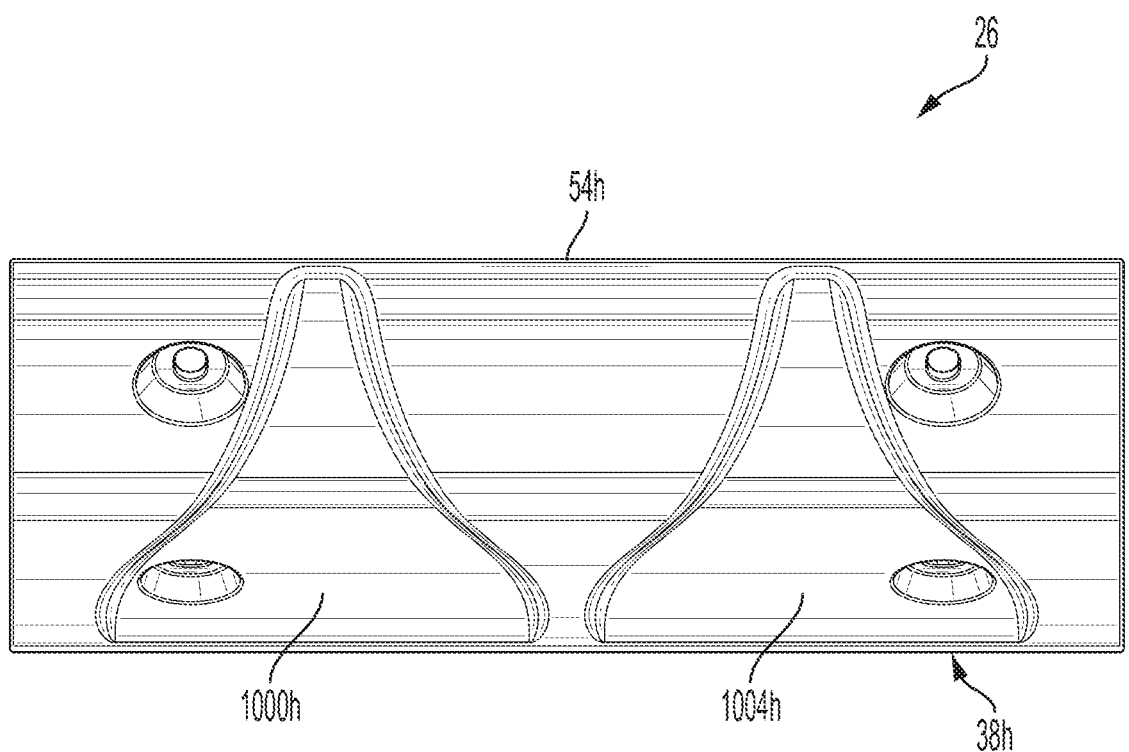

As shown in FIG. 10B, the sidewalls 82*h* of the grooves 1000*c*, 1004*c* are not parallel to one another forming an average sidewall angle 86*h* of less than or equal to approximately 45 degrees. In the illustrated implementation, the sidewall angle 86*h* of each groove 1000*h*, 1004*h* is substantially equal; however in alternative implementations, each groove 1000*h*, 1004*h* may define a unique sidewall angle 83*h*.

Each groove 1000*h*, 1004*h* also defines a corresponding groove width 94*h* (see FIG. 10A). In the illustrated implementation, the groove widths 94*h* of each groove 1000*h*, 1004*h* increases as the grooves 1000*h*, 1004*h* extend away from the leading edge 54*h* (e.g., opposite the direction of travel T). Stated differently, each groove 1000*h*, 1004*h* defines a first width 96*h* proximate the first end 74*c*, and a second width 100*c* proximate the second end 78*c* that is larger than the first width 96*h*. While the illustrated implementation shows both grooves 1000*h*, 1004*h* as having similar sizes and shapes, it is to be understood that in some implementations one groove may have an increasing width while the second groove may have a decreasing width, or any other combination thereof.

The invention claimed is:

1. A skid plate for use with a combine harvester head unit moving in a direction of travel, the skid plate comprising:
a body; and
a contact surface at least partially defined by the body, the contact surface including a leading edge facing the direction of travel and a trailing edge opposite the leading edge,
wherein the contact surface at least partially defines a groove, wherein the groove defines a groove width, and wherein the groove width varies as the groove extends away from the leading edge.

2. The skid plate of claim 1, wherein the groove width increases as the groove extends away from the leading edge.

3. The skid plate of claim 1, wherein the groove includes a first end proximate the leading edge and a second end opposite the first end that is spaced between the leading edge and the trailing edge.

4. The skid plate of claim 2, wherein the contact surface defines a contact zone, and wherein the groove includes a first end proximate the leading edge and a second end opposite the first end that is positioned between the leading edge and the contact zone.

5. The skid plate of claim 1, wherein the contact surface defines an axis oriented substantially parallel to the direction of travel, and wherein the groove extends parallel to the axis.

6. The skid plate of claim 1, wherein the groove includes a pair of sidewalls, and wherein the sidewalls are not parallel to one another over their entire length.

7. The skid plate of claim 1, wherein the groove includes a pair of sidewalls, and wherein the sidewalls are curvilinear extending away from the leading edge.

8. The skid plate of claim 1, wherein the groove smoothly transitions between a base wall of the groove and one or more adjacent surface portions.

9. The skid plate of claim 1, wherein the grooves includes a pair of sidewalls, and wherein at least a portion of the pair of sidewalls is perpendicular to a base wall of the groove.

10. The skid plate of claim 1, wherein the contact surface is substantially convex.

11. A skid plate for use with a combine harvester head unit, the skid plate comprising:
a body; and
a contact surface at least partially defined by the body, wherein the contact surface at least partially defines a groove, wherein the groove includes a first sidewall and a second sidewall, and wherein the first sidewall is not parallel to the second sidewall over the entire length of the first sidewall.

12. The skid plate of claim 11, further comprising a second groove.

13. The skid plate of claim 12, wherein the second groove includes a third sidewall and a fourth sidewall, and wherein the third sidewall is not parallel to the fourth sidewall.

14. The skid plate of claim 12, wherein the second groove defines a groove width, and wherein the groove width increases as the groove extends away from a leading edge of the contact surface.

15. The skid plate of claim 12, wherein the second groove includes a second end, and wherein the second end is positioned adjacent and open to a trailing edge of the contact surface.

16. The skid plate of claim 11, wherein the groove defines a groove width, and wherein the groove width increases as the groove extends away from a leading edge of the contact surface.

17. The skid plate of claim 11, wherein the contact surface is convex.

18. The skid plate of claim 11, wherein the contact surface includes a contact zone defining a contact plane, wherein the contact surface includes a tip portion extending between the contact zone and a leading edge, and wherein the tip portion is non-planar with the contact plane.

19. The skid plate of claim 18, wherein the contact surface includes a tail portion extending between the contact zone and a trailing edge, and wherein the tail portion is non-planar with the contact plane.

20. A skid plate for use with a combine harvester head unit, the skid plate comprising:
a body;
a contact surface including a leading edge and a trailing edge opposite the leading edge, wherein the contact surface includes:
a first groove having a first end open to the leading edge and a second end opposite the first end,
a second groove having a first end open to the leading edge and a second end opposite the first end, and
a collection groove having a first end open to the second end of the first groove and the second end of the second groove, and wherein the first groove, the second groove, and the collection groove all have the same depth.

* * * * *